(12) United States Patent
Brennan et al.

(10) Patent No.: US 9,346,221 B2
(45) Date of Patent: May 24, 2016

(54) COMPOSITE STIFFENER POSITIONING AND VACUUM BAG INSTALLATION

(75) Inventors: Joseph D. Brennan, Poway, CA (US); Donald Chester Darrow, Grand Prairie, TX (US); Kenneth M. Dull, Puyallup, WA (US); William S. Hollensteiner, Kent, WA (US); Jennifer Sue Noel, Kent, WA (US); Brian G. Robins, Renton, WA (US); Darrell D Jones, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 1139 days.

(21) Appl. No.: 12/339,455

(22) Filed: Dec. 19, 2008

(65) Prior Publication Data

US 2010/0154990 A1  Jun. 24, 2010

(51) Int. Cl.
*B29C 70/30* (2006.01)
*B29C 33/48* (2006.01)

(52) U.S. Cl.
CPC .............. *B29C 70/30* (2013.01); *B29C 33/485* (2013.01)

(58) Field of Classification Search
USPC .......... 264/101.257, 258, 299, 313, 319, 259, 264/261, 511, 512, 516, 571
See application file for complete search history.

(56) References Cited

U.S. PATENT DOCUMENTS

| | | | | |
|---|---|---|---|---|
| 2,682,924 A * | 7/1954 | Maquat et al. | ................ | 279/2.16 |
| 3,583,200 A * | 6/1971 | Cvijanovic et al. | ............. | 72/393 |
| 3,764,641 A | 10/1973 | Ash | | |
| 3,831,898 A | 8/1974 | Sachs | | |
| 4,245,970 A * | 1/1981 | St. Onge | ........................ | 425/13 |
| 4,462,787 A * | 7/1984 | Bogardus et al. | ............. | 425/402 |
| 4,754,543 A * | 7/1988 | Spivy | ............................... | 29/557 |
| 4,780,262 A | 10/1988 | VonVolkli | | |
| 5,571,357 A | 11/1996 | Darrieux et al. | | |
| 5,683,646 A | 11/1997 | Reiling, Jr. | | |
| 5,853,651 A | 12/1998 | Lindsay et al. | | |
| 6,692,681 B1 | 2/2004 | Lunde | | |
| 7,216,832 B2 | 5/2007 | Simpson et al. | | |
| 7,228,611 B2 | 6/2007 | Anderson et al. | | |
| 7,459,048 B2 | 12/2008 | Pham et al. | | |
| 8,057,618 B2 | 11/2011 | Hamlyn | | |
| 8,454,870 B2 | 6/2013 | Hollensteiner et al. | | |
| 2005/0211843 A1 | 9/2005 | Simpson et al. | | |
| 2006/0108058 A1 | 5/2006 | Chapman et al. | | |
| 2007/0175031 A1 | 8/2007 | Pham et al. | | |
| 2007/0273067 A1 | 11/2007 | Anderson et al. | | |
| 2008/0196825 A1* | 8/2008 | Hamlyn | ........................ | 156/232 |

OTHER PUBLICATIONS

U.S. Appl. No. 12/339,488, filed Dec. 19, 2008, Hollensteiner et al.
USPTO final office action for U.S. Appl. No. 12/339,488 dated Apr. 14, 2010.

(Continued)

*Primary Examiner* — Ryan Ochylski
(74) *Attorney, Agent, or Firm* — Yee & Associates, P.C.

(57) ABSTRACT

A method and apparatus for manufacturing composite parts. An expandable tool with a transfer system may be moved on a surface of the expandable tool into an outer mold line tool with a composite material laid up on the outer mold line tool. The expandable tool may be expanded in the outer mold line tool to change the surface from a retracted state to an expanded state. The transfer system may be transferred from the expandable tool with the surface in the expanded state to the outer mold line tool.

13 Claims, 17 Drawing Sheets

(56) References Cited

OTHER PUBLICATIONS

Non-final office action dated Sep. 3, 2009 regarding U.S. Appl. No. 12/339,488, 29 pages.

Notice of allowance dated Jan. 23, 2013 regarding U.S. Appl. No. 12/339,488, 14 pages.

\* cited by examiner

COMPOSITE STIFFENER POSITIONING AND VACUUM BAG INSTALLATION

CROSS REFERENCE TO RELATED APPLICATION

The present invention is related to the patent application entitled "Manufacturing One-Piece Composite Sections Using Outer Mold Line Tooling", Ser. No. 12/339,488, filed even date hereof, assigned to the same assignee, and incorporated herein by reference.

BACKGROUND INFORMATION

1. Field:

The present disclosure relates generally to manufacturing and, in particular, to manufacturing composite parts. Still more particularly, the present disclosure relates to a method and apparatus for manufacturing sections of a fuselage for an aircraft.

2. Background:

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

A section of a fuselage may be constructed as a single piece using an inner mold line tool or an outer mold line tool with an inner mold line tool. Composite material may be placed on the inner mold line tool to form one fuselage section. Forming a section of a fuselage as a single piece, as opposed to manufacturing several pieces and attaching and/or bonding those pieces to each other, may provide time and cost savings. The one piece barrel configuration may provide structural improvements and weight savings due to the elimination of splice hardware and the thinner skin at the areas where the splices would have been. Further, the lack of joints may reduce in service inspection requirements.

When using an inner mold line tool, the placement of composite material may be a part of the manufacturing process that takes the longest amount of time in manufacturing a one piece fuselage section. The inner mold line tool may be used throughout the process of manufacturing a one piece fuselage section. In other words, the inner mold line tool may not be freed up to begin manufacturing another one piece fuselage section until the current section has been completed. Consequently, the production of one piece fuselage sections may be rate limited by the amount of time needed to manufacture a one piece fuselage section because the inner mold line tool may not be used to manufacture another one piece fuselage section until the current one has been completed.

One solution may involve using multiple inner mold line tools. This type of solution, however, may increase the costs of manufacturing single piece fuselage sections because of the expense of additional inner mold line tools. Also, in some instances, the number of inner mold line tools that may be used may be limited by an amount of space available at a manufacturing facility.

Therefore, it would be advantageous to have a method and apparatus that takes into account one or more of the issues discussed above.

SUMMARY

In one advantageous embodiment, a method may be present for manufacturing composite parts. An expandable tool with a transfer system may be moved on a surface of the expandable tool into an outer mold line tool with a composite material laid up on the outer mold line tool. The expandable tool may be expanded in the outer mold line tool to change the surface from a retracted state to an expanded state. The transfer system may be transferred from the expandable tool with the surface in the expanded state to the outer mold line tool.

In another advantageous embodiment, a method may be present for installing components for a section of a composite aircraft fuselage. A vacuum bag system may be placed onto a surface of an expandable tool while the expandable tool is in a retracted state. A number of composite elements may be placed on the expandable tool after placing the vacuum bag system onto the surface. The number of composite elements may comprise at least one of a stringer and a doubler. The expandable tool with the vacuum bag system and the number of composite elements may be moved into the outer mold line tool with the composite material laid up on the outer mold line tool. The number of composite elements may be aligned on the expandable tool with a number locations for the number of composite elements. The expandable tool may be expanded in the outer mold line tool to change the surface from a retracted state to an expanded state to apply a force such that the vacuum bag system and the number of composite elements adhere to the composite material. The vacuum bag system and the number of composite elements may be transferred from the expandable tool with the surface in the expanded state to the outer mold line tool. The vacuum bag system and the number of composite elements may adhere to the composite material. The expandable tool may comprise a support structure, a plurality of segments, and an actuator system. The plurality of segments may be moveably connected to the support structure and may form a surface system with the surface. The actuator system may be capable of moving the plurality of segments to change a state of the surface between the retracted state and the expanded state. The support structure may comprise a reel and a plurality of slide members connected to the reel. Each segment in the plurality of segments may be slidably attached to a corresponding slide member in the plurality of slide members. The actuator system may comprise a plurality of linear actuators, wherein each segment in the plurality of segments may be connected to an associated linear actuator in the plurality of linear actuators. The reel may have a channel that may be capable of receiving the shaft. The shaft may be capable of support the reel.

In yet another advantageous embodiment, an apparatus may comprise a support structure, a plurality of segments, and an actuator system. The plurality of segments may be moveably connected to the support structure. The plurality of segments may form a surface system with a surface. The actuator system may be capable of moving the plurality of segments to change a state of the surface between a retracted state and an expanded state.

In a further advantageous embodiment, a positioning apparatus may be present for manufacturing one piece composite fuselage sections. The positioning apparatus may comprise a reel having a channel, a shaft, a plurality of slide members, a plurality of segments, a number of vacuum ports, and an actuator system. The shaft may be capable of being placed into the channel and supporting the reel. The plurality of slide members may be connected to the reel. The plurality of segments may be moveably connected to the plurality of slide members. The plurality of segments may form a surface system with a surface, wherein each segment in the plurality of segments is slidably attached to a corresponding slide member in the plurality of slide members. The plurality of segments may be capable of being moved inside an outer mold line tool having a composite material laid up on the outer mold line tool when the surface system has a retracted state. A transfer system may be installed onto the composite material when the surface system has the expanded state. The transfer system may comprise a vacuum bag system having a vacuum bag, a breather, a release film, and a number of stringers. The number of vacuum ports may be in a portion of the plurality of segments. The actuator system may be capable of moving the plurality of segments to change a state of the surface between a retracted state and an expanded state. The actuator system may be selected from one of a pneumatic actuator system, a hydraulic actuator system, and an electromechanical actuator system. The actuator system may comprise a plurality of linear actuators. Each segment in the plurality of segments may be connected to an associated linear actuator in the plurality of linear actuators.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
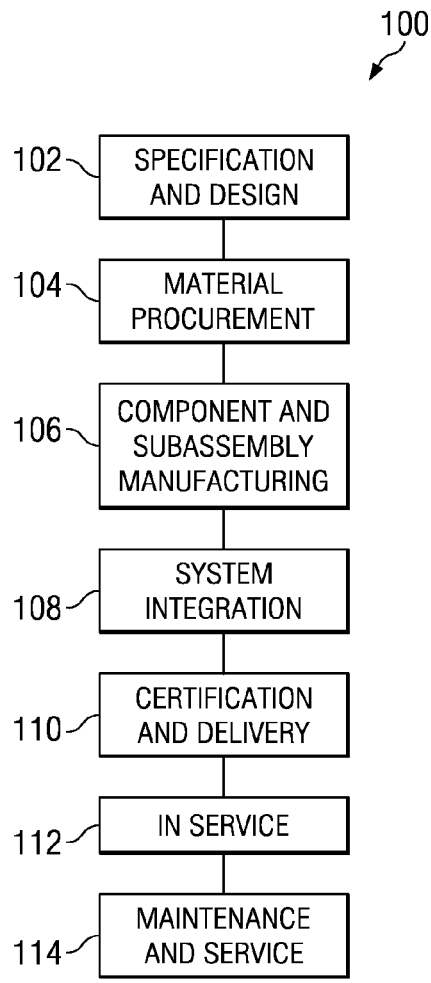
FIG. 1 is a diagram illustrating an aircraft manufacturing and service method in accordance with an advantageous embodiment.
Figure 2:
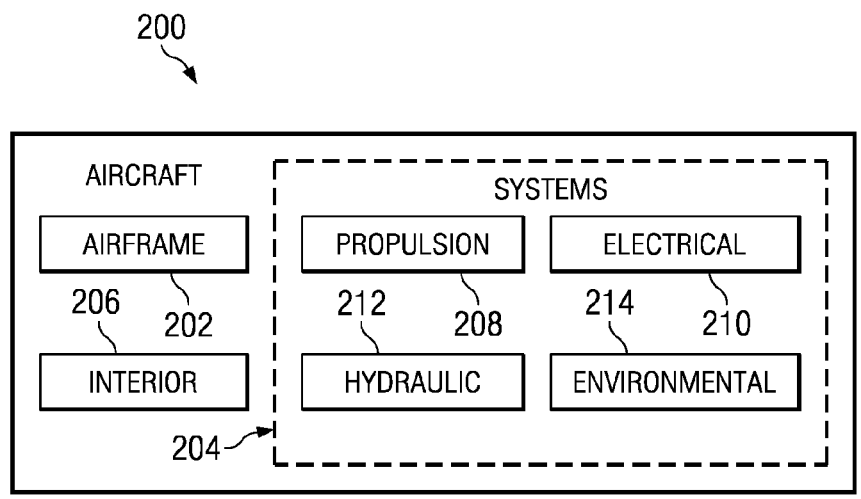
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof, may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Figure 3:
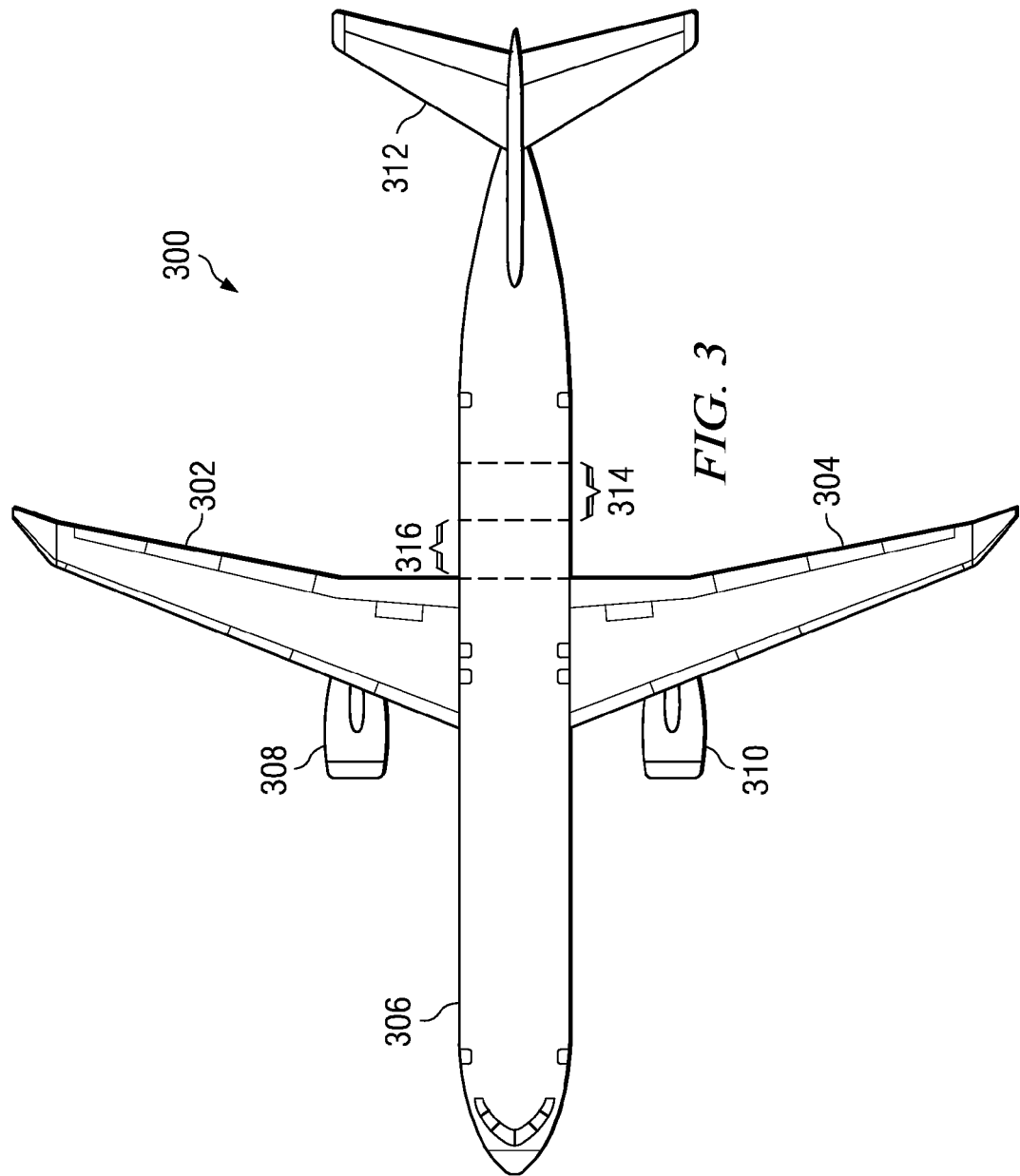
FIG. 3 is a diagram of an aircraft in which an advantageous embodiment may be implemented.

With reference now to FIG. 3, a diagram of an aircraft is depicted in which an advantageous embodiment may be implemented. Aircraft 300 is an example of aircraft 200 in FIG. 2 in which composite parts may be manufactured using advantageous embodiments. In this illustrative example, aircraft 300 has wings 302 and 304 attached to body 306. Aircraft 300 includes wing-mounted engine 308, wing-mounted engine 310, and tail 312.

Various parts of aircraft 300 may be composite parts manufactured using advantageous embodiments. For example, without limitation, section 314 of fuselage 306 may be a one piece fuselage section. This section may be joined to other sections such as, for example, without limitation, one piece fuselage section 316, to form fuselage 306.

The different advantageous embodiments take into account and recognize that freeing up tools during the manufacturing of composite parts may increase the rate at which composite parts may be manufactured. The different advantageous embodiments recognize and take into account that with current manufacturing processes, the composite parts such as, for example, a single piece fuselage section may be laid up on an inner mold line tool.

The different advantageous embodiments also recognize and take into account that this tool may also be used during other parts of the manufacturing process such as, for example, without limitation, caul placement, bagging, curing, debagging, trimming, demolding, and other suitable operations used to manufacture the composite part. The different advantageous embodiments recognize and take into account that freeing up a tool for laying up another part may increase the rate at which parts may be manufactured.

Thus, the different advantageous embodiments provide a method and apparatus for manufacturing a composite part. A temporary removal layer may be placed on an inner mold line tool. A composite material may be laid up on the inner mold line tool for the composite part. The inner line mold tool with the composite part may be positioned inside an outer mold line tool. The composite part and the temporary removal layer may be transferred from the inner mold line tool to the outer mold line tool.

The inner mold line tool may then be removed from inside of the outer mold line tool, and the temporary removal layer may also be removed after transfer of the composite part and the temporary removal layer to the outer mold line tool. Other composite materials and/or elements may also be laid up for the composite part on the interior of the outer mold line tool after the composite part has been transferred to the outer mold line tool.

In this manner, the different advantageous embodiments may free up the inner mold line tool for laying up composite material for another part while the current composite part continues to be processed. Further, the different advantageous embodiments also may allow for additional elements to be added to the composite part that may not require the inner mold line tool.

Further, the process also provides a method and apparatus for positioning components for manufacturing composite parts. An expandable tool with a vacuum bag system on a surface of the expandable tool may be moved into an outer mold line tool with a composite material laid up for a composite part on the outer mold line tool. The expandable tool may be expanded inside the outer mold line tool to change the surface of the expandable tool from a retracted state to an expanded state. The vacuum bag system may then be transferred from the expandable tool with the surface in the expanded state to the outer mold line tool. The vacuum bag system may then be used for curing of the composite part laid up on the outer mold line tool.

Additionally, the expandable tool also may be used as an inner mold line tool for laying up composite material for a composite part. In this manner, the expandable tool may be used to transfer the composite material to an outer line mold. The expandable tool may then be used to install a vacuum bag system. If two expandable tools are present, the time needed for these processes also may be reduced. The different advantageous embodiments also may use the expandable tool to install structures on the composite material for a composite part. These structures may include, for example, without limitation, a stringer and/or some other suitable insert or internal structure.

Figure 4:
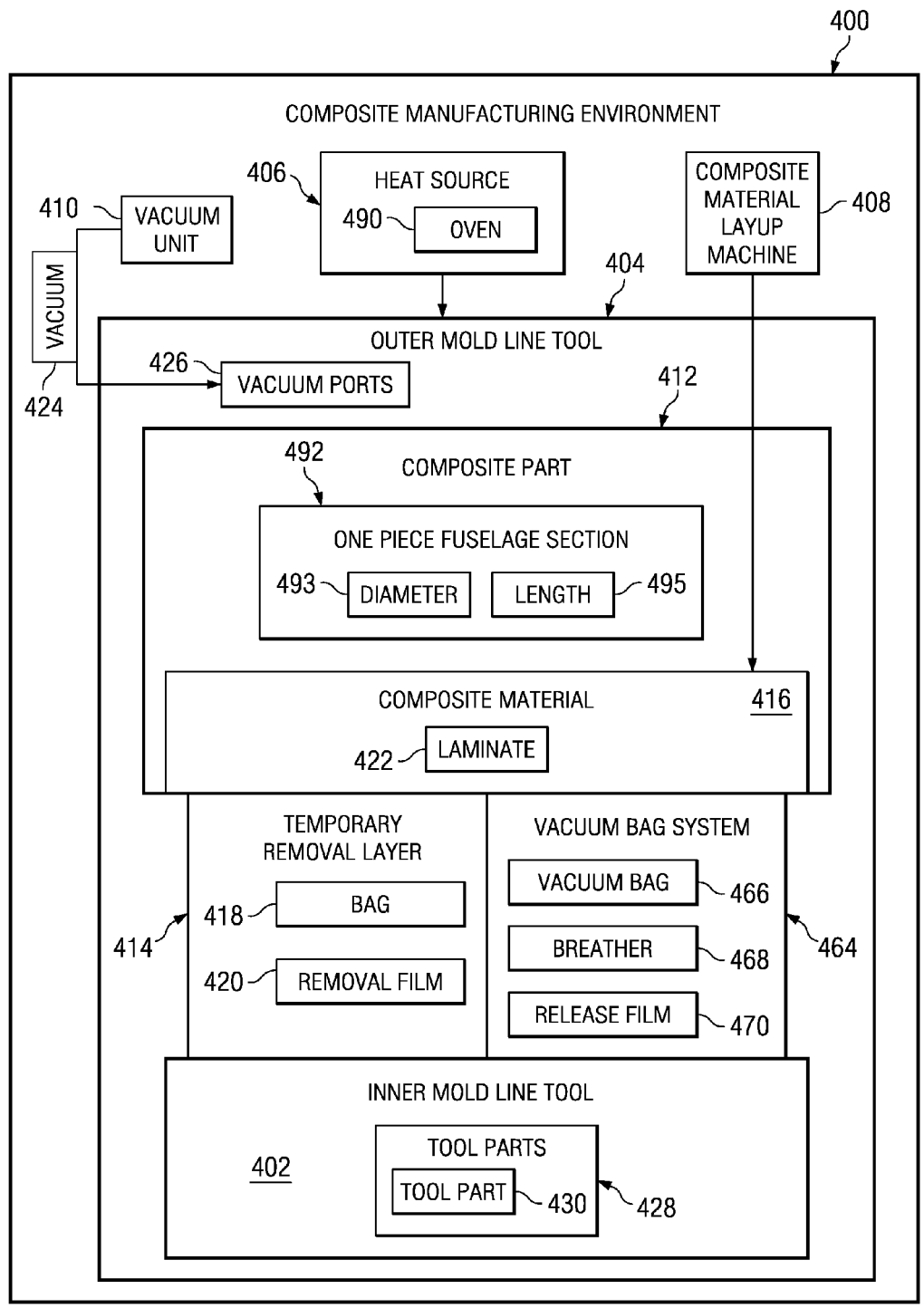
FIG. 4 is a diagram of a composite manufacturing environment in accordance with an advantageous embodiment.

With reference now to FIG. 4, a diagram of a composite manufacturing environment is depicted in accordance with an advantageous embodiment. Composite manufacturing environment 400 is an example of a manufacturing environment that may be used to manufacture composite parts, such as those for aircraft 300 in FIG. 3.

Composite manufacturing environment 400 may include inner mold line tool 402, outer mold line tool 404, heat source 406, composite material layup machine 408, and vacuum unit 410.

In manufacturing composite part 412, temporary removal layer 414 may be placed onto inner mold line tool 402. Composite material 416 may then be laid up on inner mold line tool 402 for composite part 412.

Temporary removal layer 414 may be any component and/or device capable of allowing composite material 416 to be transferred or moved off of inner mold line tool 402. Temporary removal layer 414 may be, for example, without limitation, bag 418, removal film 420, and/or any other suitable component. Bag 418 and/or removal film 420 may have a plastic layer that may be capable of transferring or moving composite material 416 off of inner mold line tool 402 and being removed from composite material 416 after composite material 416 has been transferred. Bag 418 may be, for example, without limitation, a vacuum bag or some other suitable bag for transferring composite material 416.

In this illustrative example, composite material 416 may be laid up on temporary removal layer 414 on inner mold line tool 402 by composite material layup machine 408. Composite material 416 may be, for example, without limitation, laminate 422. Laminate 422 may be multiple layers of fabric with resins laid up on inner mold line tool 402 by composite material layup machine 408.

After composite material 416 for composite part 412 has been laid up on inner mold line tool 402, inner mold line tool 402 may be positioned with composite part 412 inside of outer mold line tool 404. Composite part 412 may be the complete composite part or may require additional elements or processes to be added.

In these examples, inner mold line tool 402 may be moved concentrically into outer mold line tool 404. This movement may result in inner mold line tool 402 being substantially concentric with outer mold line tool 404. With inner mold line tool 402 and composite part 412 positioned inside of outer mold line tool 404, composite part 412 and temporary removal layer 414 may be transferred from inner mold line tool 402 to outer mold line tool 404. In these examples, temporary removal layer 414 may be secured and/or vacuum sealed to outer mold line tool 404. Vacuum 424 may be applied to vacuum ports 426 in outer mold line tool 404 to cause composite material 416 for composite part 412 to move to and/or adhere to outer mold line tool 404 and/or away from inner mold line tool 402.

After composite part 412 has been transferred to outer mold line tool 404, inner mold line tool 402 and temporary removal layer 414 may be removed from inside of outer mold line tool 404. Inner mold line tool 402 may be removed in a number of different ways. For example, inner mold line tool 402 may be moved outside of outer mold line tool 404.

In other advantageous embodiments, inner mold line tool 402 may be comprised of tool parts 428. With this type of implementation, inner mold line tool 402 may be removed from inside of outer mold line tool 404 by collapsing and/or disassembling tool parts 428. As a tool part, such as tool part 430, is disassembled from tool parts 428, tool part 430 may be removed from inside outer mold line tool 404. This type of construction of inner mold line tool 402 may provide a capability to more quickly and/or easily remove inner mold line tool 402 from outer mold line tool 404 after transfer of composite part 412 to outer mold line tool 404.

After inner mold line tool 402 has been removed from outer mold line tool 404, temporary removal layer 414 also may be removed from outer mold line tool 404. Composite part 412 may then adhere and/or couple to outer mold line tool 404 with the aid of vacuum 424 applied by vacuum unit 410 through vacuum ports 426.

Thereafter, vacuum bag system 464 may be installed over composite material 416 on outer mold line tool 404. Vacuum bag system 464 may include vacuum bag 466. In different advantageous embodiments, vacuum bag system 464 also may include breather 468 and release film 470. Composite part 412 with vacuum bag system 464 may then be cured using heat source 406. In these examples, heat source 406 may be, for example, oven 490. Vacuum bag system 464 may comprise vacuum bag 466, breather 468, release film 470, and/or some other suitable component.

In these examples, composite part 412 may take various forms. For example, without limitation, composite part 412 may be one piece fuselage section 492. In this illustrative example, one piece fuselage section 492 may have diameter 493 and length 495. Diameter 493 may be around 30 feet or more, while length 495 may be up to around 50 feet or more. The different advantageous embodiments may be used to manufacture other compounds such as, for example, without limitation, skin panels for wings, radomes, telephone poles, train cars, buses, car hoods, and other suitable items and/or objects.

The illustration of composite manufacturing environment 400 in FIG. 4 is not meant to imply physical or architectural limitations to the manner in which different advantageous embodiments may be implemented. For example, other components in addition to, or in place of, the ones illustrated may be used depending on the particular implementation. Further, some components may be unnecessary in some advantageous embodiments. For example, in some advantageous embodiments, a number of inner mold line tools in addition to inner mold line tool 402 may be used in manufacturing composite parts. Further, in other advantageous embodiments, composite part 412 may be a wing section, a panel, or some other suitable part.

As another example, inner mold line tool 402 may be comprised of a mandrel wrapped in an inflated bladder or a vacuum bag that encloses an open cell foam. In this form, temporary removal layer 414 may be wrapped around this form of inner mold line tool 402. Thereafter, composite material 416 may be laid up on inner mold line tool 402. Inner mold line tool 402 may be moved inside of outer mold line tool 404. Thereafter, the bladder may be deflated or the vacuum bag may be evacuated after composite material 416 is transferred to outer mold line tool 404.

For example, tool parts 428 may also take the form of a bladder and/or vacuum bag that encloses an open cell foam.

Figure 5:
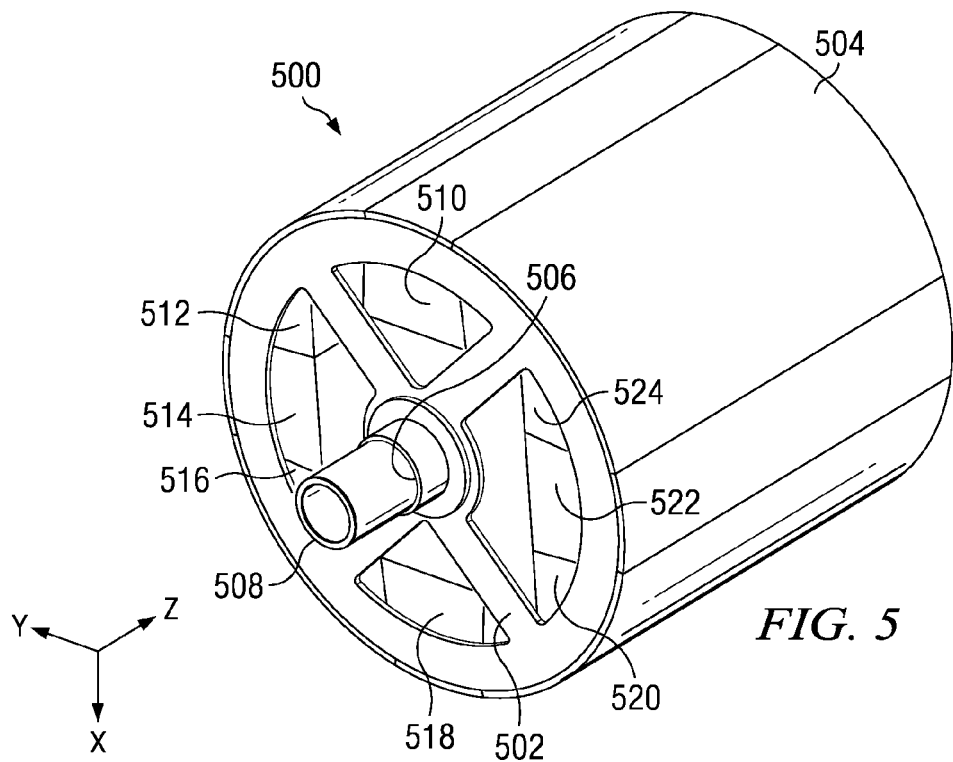
FIG. 5 is a diagram of a perspective view of an inner mold line tool in accordance with an advantageous embodiment.

With reference now to FIG. 5, a diagram of a perspective view of an inner mold line tool is depicted in accordance with an advantageous embodiment. In this example, inner mold line tool 500 may be an example of one implementation of inner mold line tool 402 in FIG. 4.

Inner mold line tool 500 may be configured for use in manufacturing a composite part such as, for example, a one piece fuselage section. Inner mold line tool 500 may have support structure 502 on which surface 504 may be present. Additionally, inner mold line tool 500 may have channel 506 in support structure 502. Channel 506 may receive shaft 508. In this example, a composite material may be laid up on surface 504 for a composite part.

In this illustrative example, inner mold line tool 500 may be disassembled and/or collapsed after a composite material has been transferred to an outer mold line tool. Support structure 502, in these examples, may have collapsible sections 510, 512, 514, 516, 518, 520, 522, and 524, which may be moved inwards toward shaft 508 and then removed.

In these examples, inner mold line tool 500 may be made from materials incapable of withstanding curing processes or have undesirable properties at elevated temperatures, because inner line mold tool 500 may not be used for curing the composite part. For example, collapsible sections 510, 512, 514, 516, 518, 520, 522, and 524 may be constructed from foam face sheets, fiberglass, aluminum, low-temperature composites, and/or other suitable materials.

Figure 6:
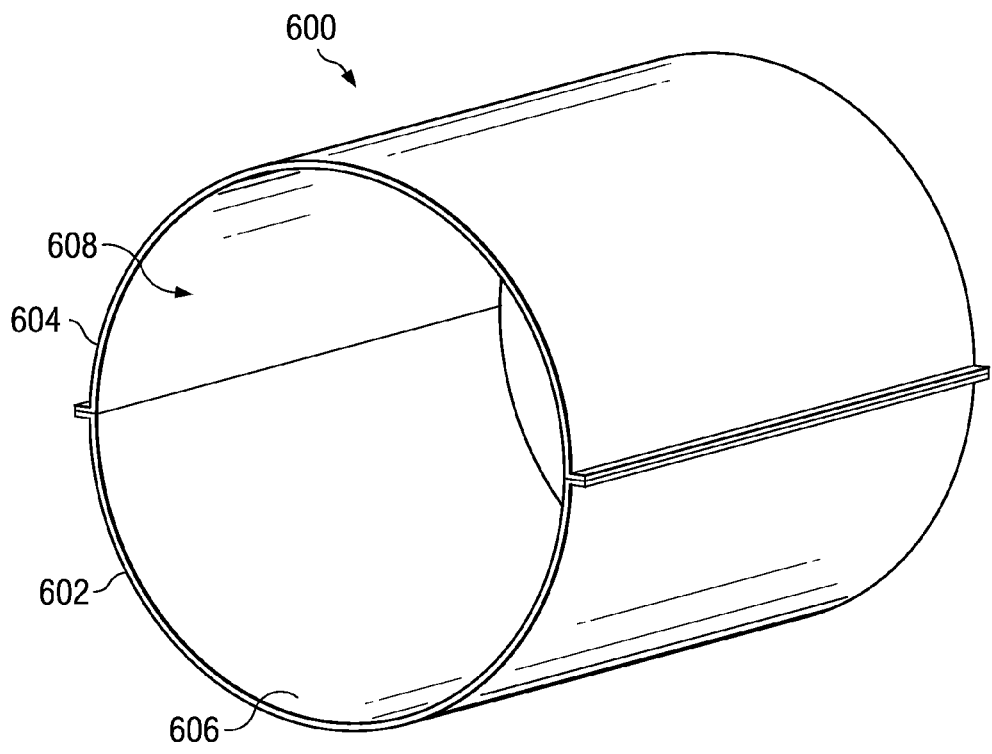
FIG. 6 is a diagram illustrating a perspective view of an outer mold line tool in accordance with an advantageous embodiment.

With reference now to FIG. 6, a diagram illustrating a perspective view of an outer mold line tool is depicted in accordance with an advantageous embodiment. Outer mold line tool 600 may be an example of one implementation for outer mold line tool 404 in FIG. 4.

As illustrated, outer mold line tool 600 may have base part 602 and top part 604. These two parts may be secured to each other to form surface 606 around channel 608. An inner mold line tool such as, for example, inner mold line tool 500 may be placed into channel 608 to transfer a composite part from inner mold line tool 500 to surface 606 of outer mold line tool 600.

Figure 7:
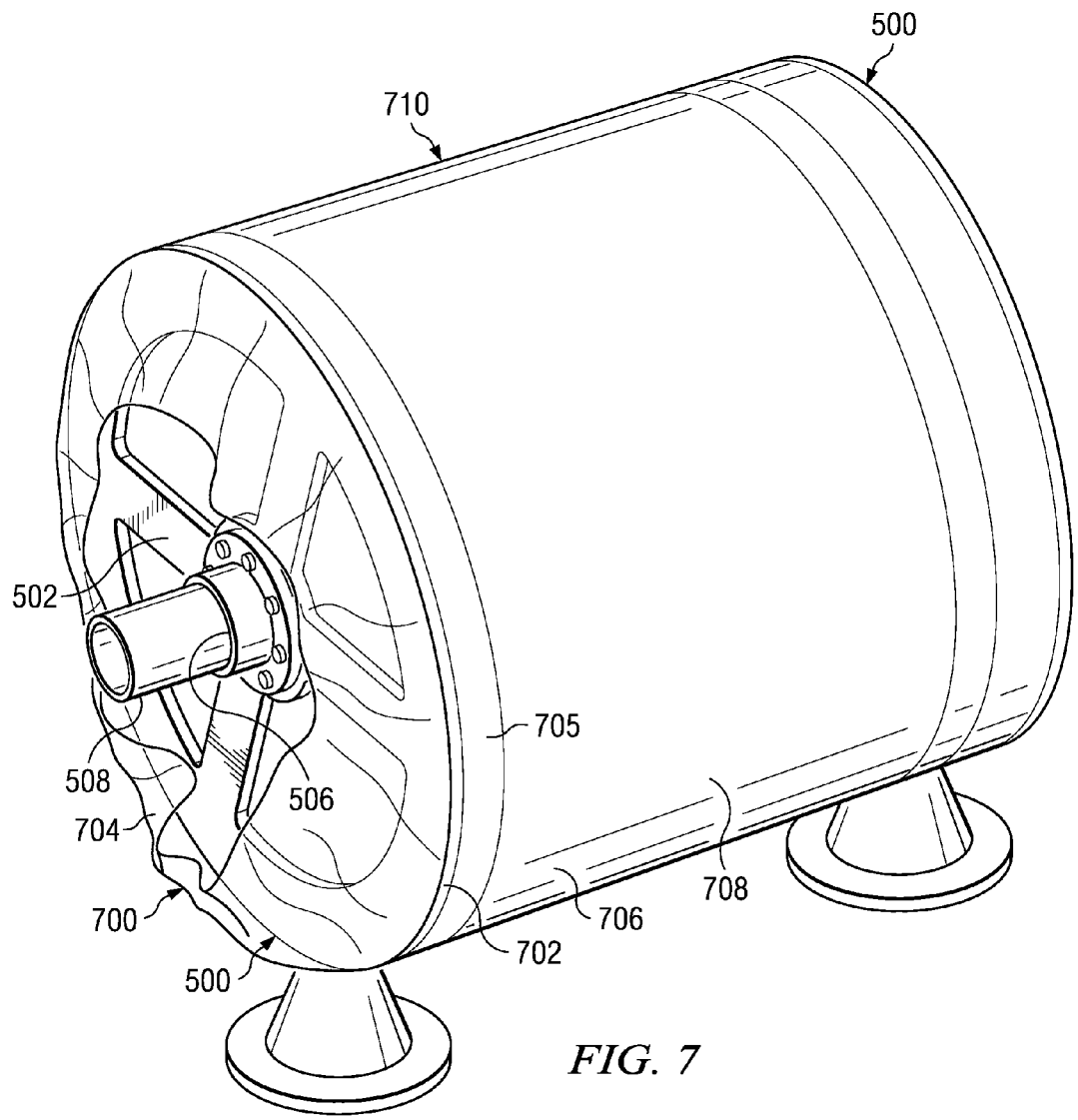
FIG. 7 is a diagram illustrating a perspective view of an inner mold line tool with a composite part laid up on the inner mold line tool in accordance with an advantageous embodiment.

With reference now to FIG. 7, a diagram illustrating a perspective view of an inner mold line tool with a composite part laid up on the inner mold line tool is depicted in accordance with an advantageous embodiment. In this example, inner mold line tool 500 may have temporary removal layer 700 laid up on surface 702 of inner mold line tool 500. Temporary removal layer 700, in this illustrative example, may take the form of bag 704 and partial bag 705. Composite material 706 may be laid up on bag 704. In this example, composite material 706 may be laminate 708 for one piece fuselage section 710.

Bag 700 may take the form of a stretch bag rather than a vacuum bag. Bag 700 may be comprised of materials selected from, for example, without limitation, silicone, fluorinated ethylene propylene, a fluoroelastomer, and/or other suitable materials.

The application of partial bag 705 may reduce the risk of laminate 708 becoming free from inner mold line tool 500 and collapsing before bag 700 is applied. When bag 700 and partial bag 705 are transferred to outer mold line tool 600 and vacuum is applied to transfer laminate 708 to outer mold line tool 600, bag 700 may be removed but partial bag 705 may still remain sealed to laminate 708 and tool and vacuum may still be applied.

Figure 8:
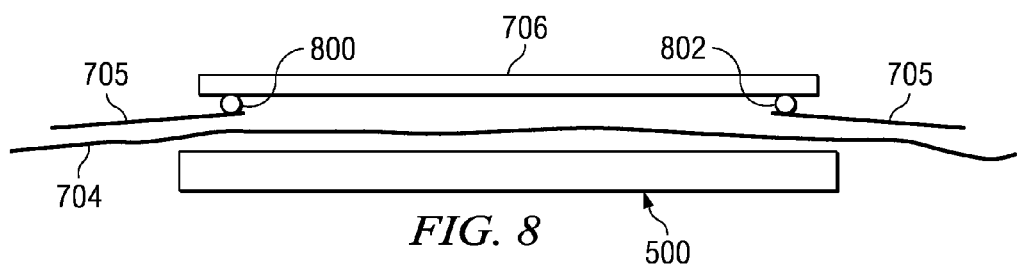
FIG. 8 is a diagram illustrating a cross-sectional view of a portion of an inner mold line tool with a composite part laid up on the inner mold line tool in accordance with an advantageous embodiment.

With reference now to FIG. 8, a diagram illustrating a cross-sectional view of a portion of an inner mold line tool with a composite part laid up on the inner mold line tool is depicted in accordance with an advantageous embodiment.

In this diagram, a cross sectional view of inner mold line tool 500 with bag 704, partial bag 705, and composite material 706 is illustrated. Sealant 800 and sealant 802 may be used to secure partial bag 705 to composite material 706 in this illustrative example. Composite material 706 may be composite material for a part such as, for example, composite part 412 in FIG. 4. More specifically, composite material 706 may be part of one piece fuselage section 492 in FIG. 4.

Figure 9:
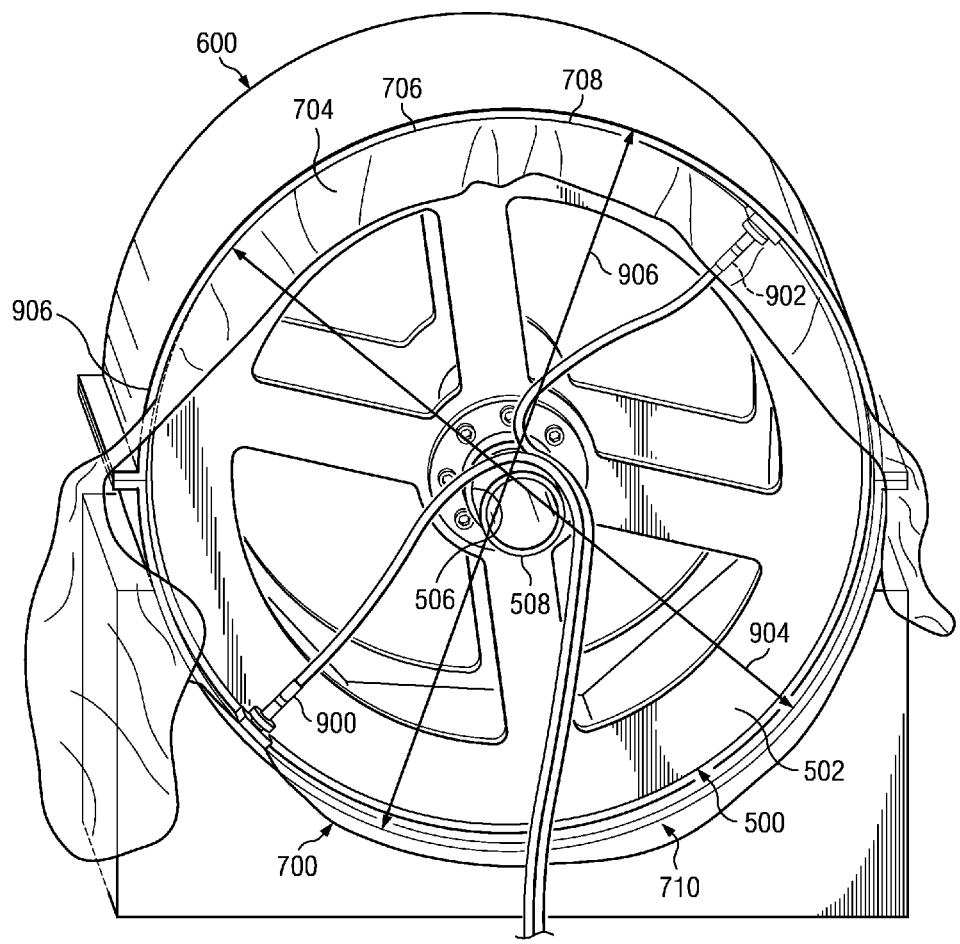
FIG. 9 is a diagram illustrating an inner mold line tool positioned within an outer mold line tool in accordance with an advantageous embodiment.

With reference now to FIG. 9, a diagram illustrating inner mold line tool 500 positioned within outer mold line tool 600 is depicted in accordance with an advantageous embodiment. In this example, temporary removal layer 700 may be secured to outer mold line tool 600. Additionally, a vacuum may be applied to composite material 706 and temporary removal layer 700 through vacuum ports 900 and 902 in outer mold line tool 600.

In this illustrative example, inner mold line tool 500 has diameter 904, while outer mold line tool 600 has diameter 906. Diameter 904 may be smaller than diameter 906 with a difference such that movement of composite material 706 from inner mold line tool 500 to outer mold line tool 600 does not stretch fibers or components in composite material 706 in an undesirable manner.

For example, diameter 904 may be selected such that movement of composite material 706 from inner mold line tool 500 to outer mold line tool 600 does not have an undesirable effect on fibers in composite material 706. As another example, the movement of composite material 706 from inner mold line tool 500 to outer mold line tool 600 should not undesirably stretch composite material 706 in a manner that may change a thickness of composite material 706 beyond some desired tolerance.

Figure 10:
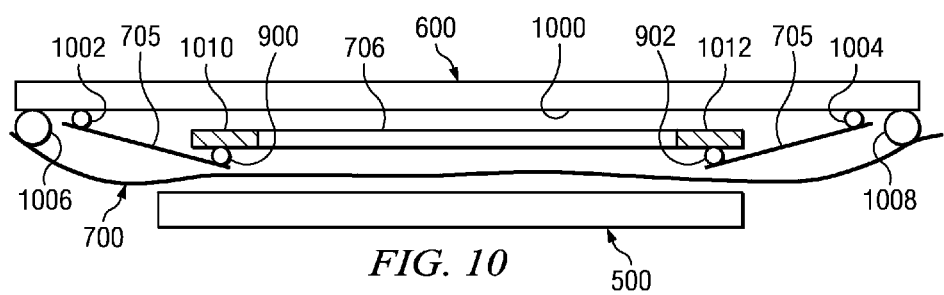
FIG. 10 is a diagram illustrating a cross-sectional view of an inner line mold positioned within an outer line mold in accordance with an advantageous embodiment.

With reference now to FIG. 10, a diagram illustrating a cross-sectional view of an inner line mold positioned within an outer line mold is depicted in accordance with an advantageous embodiment.

In this cross-sectional view, inner mold line tool 500 may be shown positioned inside of outer mold line tool 600. Bag 704, partial bag 705, and composite material 706 may be transferred to outer mold line tool 600 in this illustrative example.

This transfer may occur with partial bag 705 being secured to surface 1000 of outer mold line tool 600 using sealant 1002 and sealant 1004. Bag 700 also may be secured to surface 1000 of outer mold line tool using sealant 1006 and sealant 1008. The transfer of bag 704, partial bag 705, and composite material 706 may be performed by applying a vacuum to composite material 706 to draw composite material 706 towards outer mold line tool 600 away from inner mold line tool 500. In these examples, section 1010 and section 1012 of composite material 706 may be trimmed off for scrap during processing.

Figure 11:
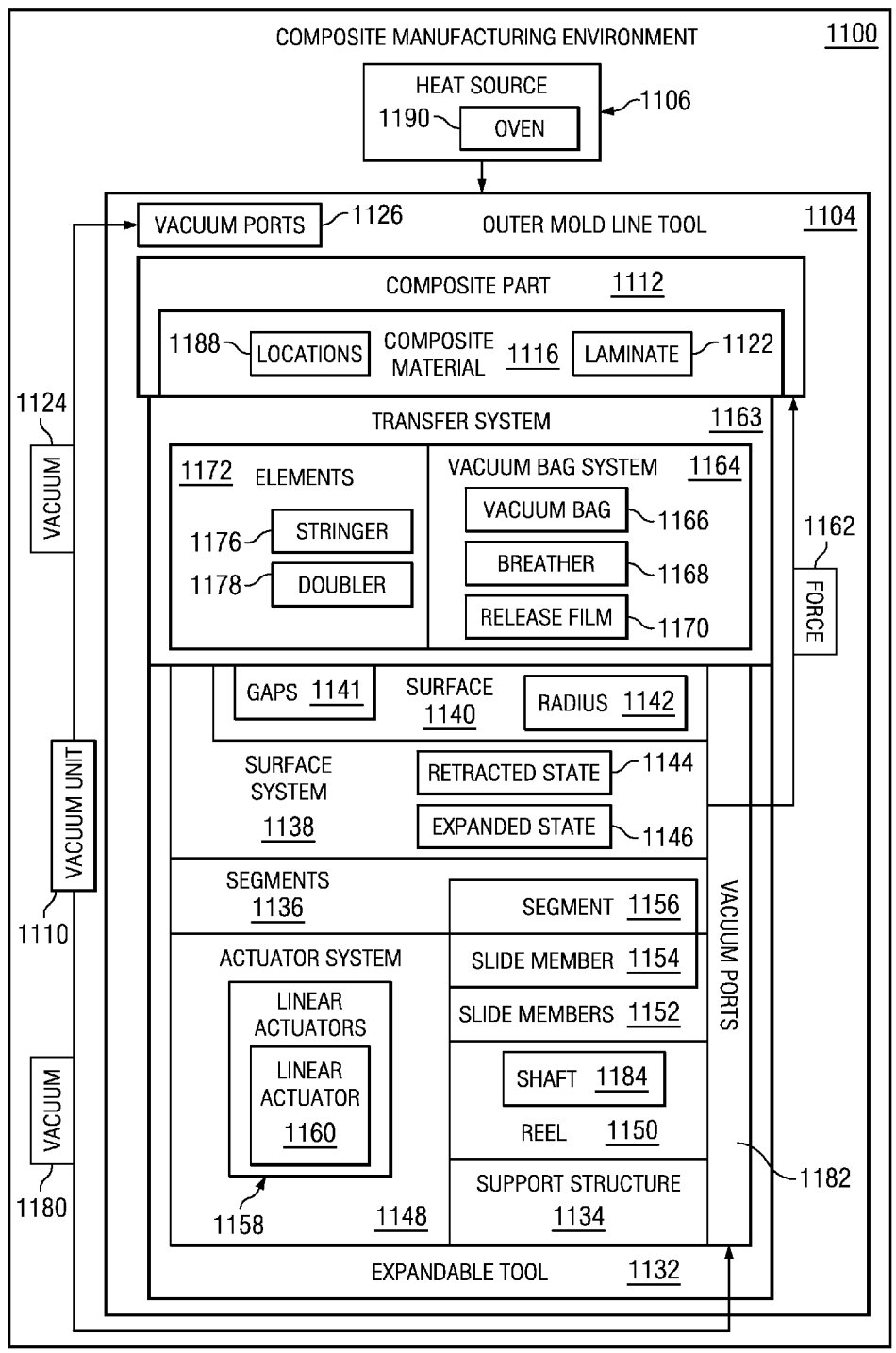
FIG. 11 is a diagram of a composite manufacturing environment in accordance with an advantageous embodiment.

With reference now to FIG. 11, a diagram of a composite manufacturing environment is depicted in accordance with an advantageous embodiment. Composite manufacturing environment 1100 is an example of a manufacturing environment that may be used to manufacture composite parts, such as those for aircraft 300 in FIG. 3.

In this illustrative example, composite manufacturing environment 1100 may include expandable tool 1132. Expandable tool 1132 may be used to install transfer system 1163 onto composite material 1116 for composite part 1112 on outer mold line tool 1104. In this example, composite material 1116 may take the form of laminate 1122. Transfer system 1163 may take various forms. For example, transfer system 1163 may be vacuum bag system 1164. With this type of implementation, vacuum bag system 1164 may include vacuum bag 1166, breather 1168, release film 1170, and/or some other suitable component for a vacuum bag system.

Further, transfer system 1163 also may include other components such as, for example, elements 1172. These elements may be, for example, stringer 1176, doubler 1178, and/or some other suitable type of element. Transfer system 1163 also may include other suitable components such as, for example, without limitation, peel plies, composite plies, and/or other suitable components that may be transferred to outer mold line tool 1104.

Expandable tool 1132 may have support structure 1134 and segments 1136. Segments 1136 may be movably coupled to support structure 1134 and may form surface system 1138 having surface 1140. In these examples, surface 1140 may or may not be contiguous. In other words, gaps 1141 may be present within surface 1140 depending on the particular implementation.

Surface system 1138 and surface 1140 may have retracted state 1144 and expanded state 1146. Radius 1142 of surface 1140 may change as surface system 1138 moves between retracted state 1144 and expanded state 1146. Movement of surface system 1138 between retracted state 1144 and expanded state 1146 may be accomplished using actuator system 1148.

In these examples, support structure 1134 may have reel 1150 and slide members 1152. Surface system 1138 may be movably attached to slide members 1152. For example, without limitation, slide member 1154 in slide members 1152 may be attached to segment 1156 in segments 1136. Slide members 1152 may slide on reel 1150.

In these examples, actuator system 1148 may have linear actuators 1158. For example, without limitation, linear actuator 1160 in linear actuators 1158 may be attached to slide member 1154. As a result, movement of slide member 1154 by linear actuators 1158 may change radius 1142 of surface 1140.

The installation of vacuum bag 1164 may be performed using expandable tool 1132 to prepare composite part 1112 for curing by heat source 1106. In the different advantageous embodiments, vacuum bag system 1164 may be placed onto surface 1140 of expandable tool 1132 in retracted state 1144.

With vacuum bag system 1164 on surface 1140 of expandable tool 1132, expandable tool 1132 may be placed into outer mold line tool 1104 in retracted state 1144. In these examples, expandable tool 1132 is moved concentrically into outer mold line tool 1104. In other words, when inside of outer mold line tool 1104, expandable tool 1132 is positioned such that it is substantially concentric with outer mold line tool 1104.

When inside outer mold line tool 1104, expandable tool 1132 may be moved into expanded state 1146. In expanded state 1146, vacuum bag 1164 may be secured to outer mold line tool 1104 over composite part 1112. Vacuum 1124 may be applied by vacuum unit 1110 through vacuum ports 1126 in outer mold line tool 1104 to facilitate transfer of vacuum bag system 1164 from expandable tool 1132 to outer mold line tool 1104. After securing vacuum bag system 1164 to outer mold line tool 1104, expandable tool 1132 may be moved into retracted state 1144. Thereafter, expandable tool 1132 may be removed from inside of outer mold line tool 1104. At this point, composite part 1112 may be ready for curing by heat source 1106.

Additionally, elements 1172 also may be placed onto expandable tool 1132 for installation onto composite material 1116. Elements 1172 may be placed in gaps 1141 in surface 1140. These elements may include, for example, without limitation, composite elements, thermoplastic elements, titanium elements, and/or other suitable elements.

Elements 1172 may take various forms. Elements 1172 may be a number of elements. A number of items, as used herein, refers to one or more items. For example, a number of elements is one or more elements. For example, elements 1172 may be at least one of stringer 1176, doubler 1178, and/or some other suitable composite element. Doubler 1178 may be comprised of composite plies, a metal ply, a screen, or some other suitable component.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Vacuum bag system 1164 and elements 1172 may be held in place on surface 1140 of expandable tool 1132 by applying vacuum 1180 by vacuum unit 1110 through vacuum ports 1182 in expandable tool 1132. In these examples, reel 1150 may receive shaft 1184 for use in moving expandable tool 1132 into outer mold line tool 1104. Surface 1140 may be changed from retracted state 1144 to expanded state 1146. Thereafter, vacuum bag system 1164 may be transferred from expandable tool 1132 with surface 1140 in expanded state 1146 to outer mold line tool 1104.

Further, when elements 1172 may be present, the expansion of expandable tool 1132 from retracted state 1144 to expanded state 1146 may apply force 1162 such that elements 1172 contact and/or couple to composite material 1116 for composite part 1112. Vacuum bag system 1164 may be sealed to outer mold line tool 1104. When expandable tool 1132 with vacuum bag system 1164 and elements 1172 may be moved into outer mold line tool 1104, expandable tool 1132 may be moved to align elements 1172 with locations 1188 for elements 1172.

After expandable tool 1132 has been removed from outer mold line tool 1104, outer mold line tool 1104 with composite part 1112 and vacuum bag system 1164 may be cured using heat source 1106. In these examples, heat source 1106 may be, for example, oven 1190.

The illustration of composite manufacturing environment 1100 in FIG. 11 is not meant to imply physical or architectural limitations to the manner in which different advantageous embodiments may be implemented. For example, other components in addition to, or in place of, the ones illustrated may be used depending on the particular implementation. Further, some components may be unnecessary in some advantageous embodiments.

For example, expandable tool 1132 also may be used as an inner mold line tool. For example, composite material 1116 may be laid up on surface 1140. In these examples, surface system 1138 may have a state between retracted state 1144 and expanded state 1146 such that when surface system 1138 expands surface 1140 to expanded state 1146, composite material 1116 is not stretched in an undesirable manner.

As another example, expandable tool 1132 may be implemented in other manners to provide the same result. For example, without limitation, expandable tool 1132 in FIG. 11 may be implemented using a mandrel with a non-inflated bladder and/or an evacuated vacuum bag with an open celled foam located within the vacuum bag. The bladder may be inflated or the vacuum may be removed on the vacuum bag to cause the outer surface of these components to expand to change from retracted state 1144 to expanded state 1146.

Figure 12:
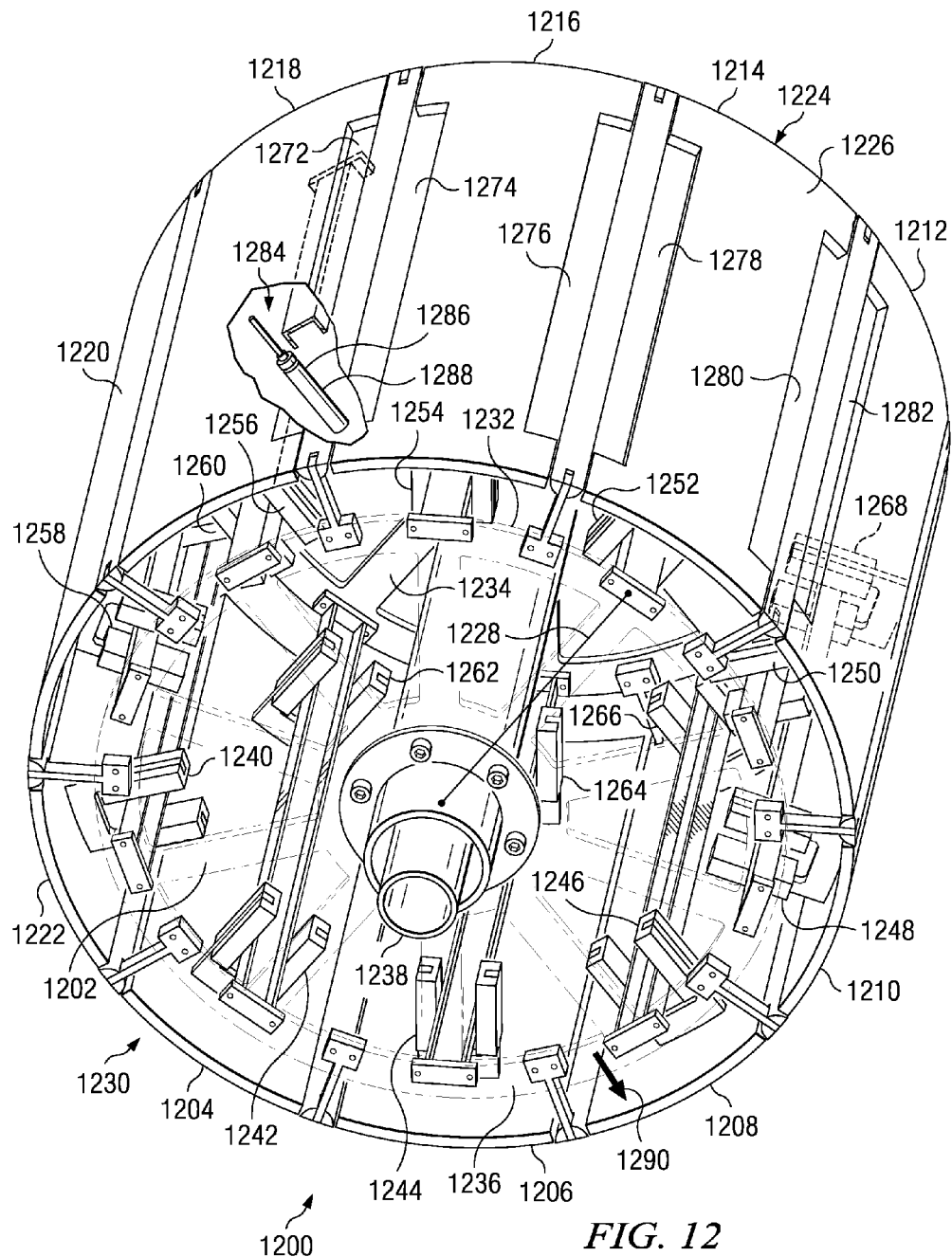
FIG. 12 is a diagram of a perspective view of an expandable tool in accordance with an advantageous embodiment.

With reference now to FIG. 12, a diagram of a perspective view for an expandable tool is depicted in accordance with an advantageous embodiment. In this example, expandable tool 1200 may be an example of one implementation of expandable tool 1132 in FIG. 11.

In this illustrative example, expandable tool 1200 may have support structure 1202 to which segments 1204, 1206, 1208, 1210, 1212, 1214, 1216, 1218, 1220, and 1222 may be movably attached. These segments may be part of surface system 1224 and may form surface 1226.

In this example, expandable tool 1200 may have radius 1228 and may be shown in retracted state 1230. In this example, support structure 1202 may include reel 1232, which may be formed from wheel 1234, wheel 1236, and shaft 1238. In these depicted examples, segments 1204, 1206, 1208, 1210, 1212, 1214, 1216, 1218, 1220, and 1222 may be slidably attached to support structure 1202 through slide members 1240, 1242, 1244, 1246, 1248, 1250, 1252, 1254, 1256, 1258, 1260, 1262, 1264, 1266, and 1268.

Gaps such as, for example, without limitation, gaps 1272, 1274, 1276, 1278, 1280, and 1282 on surface 1226 of expandable tool 1200 may be present. These gaps may provide a capability to hold and/or receive elements such as, for example, without limitation, stringers, doublers, and other suitable elements.

Expandable tool 1200 also may have actuator system 1284, which may take the form of linear actuator 1286. In this example, linear actuator 1286 may be air cylinder 1288. Other linear actuators for expandable tool 1200 are not shown for linear actuator system 1284 in this example to avoid obscuring the illustration of the different features of expandable tool 1200. In one implementation, actuator system 1284 may have a linear actuator, such as linear actuator 1286, associated with each of segments 1204, 1206, 1208, 1210, 1212, 1214, 1216, 1218, 1220, and 1222 to move those segments on associated slide members. In this manner, linear actuator 1286 may move a segment such as segment 1218 in the direction of arrow 1290.

Figure 13:
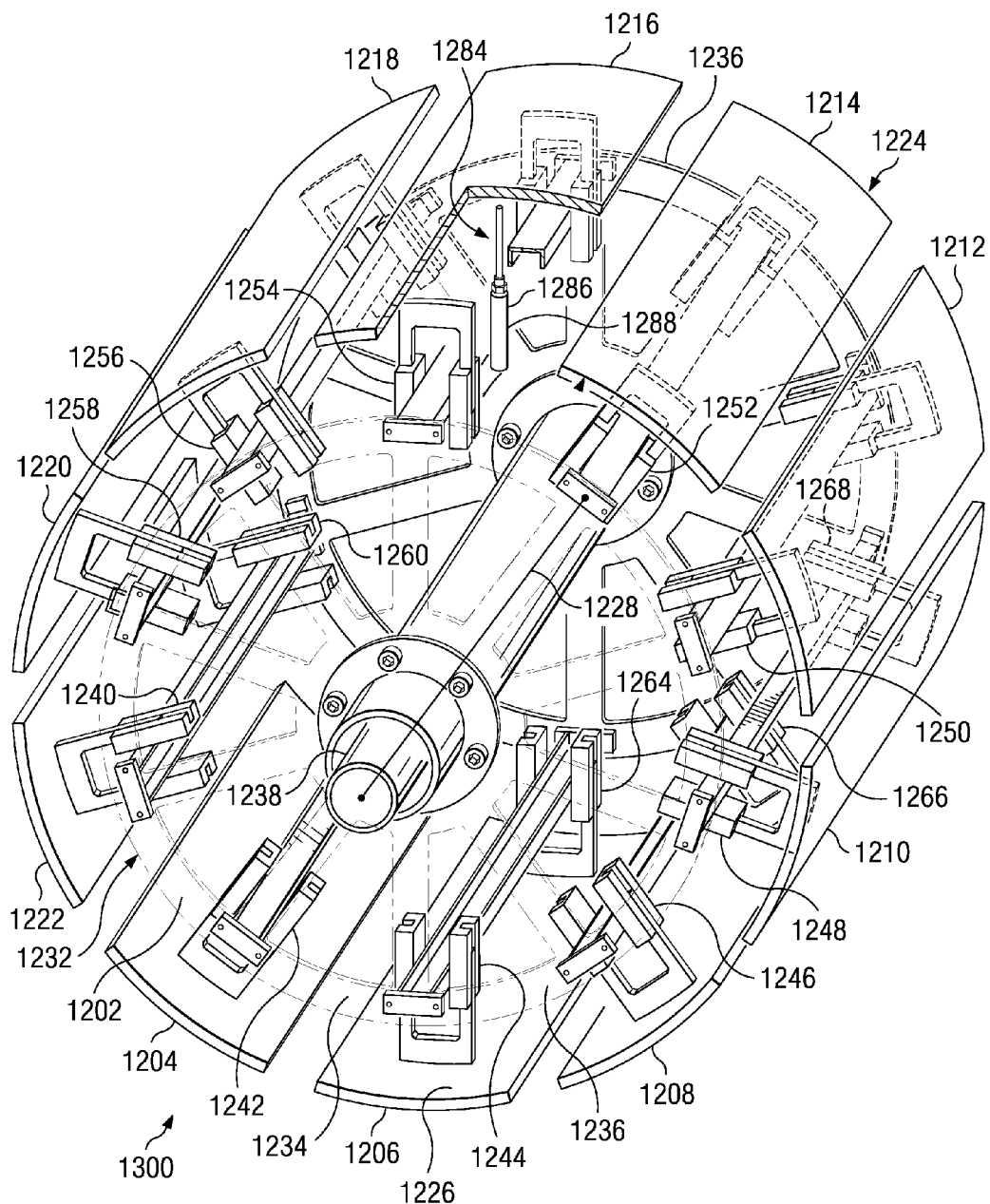
FIG. 13 is a diagram of a perspective view of an expandable tool with a surface in an expanded state in accordance with an advantageous embodiment.

With reference now to FIG. 13, a diagram of a perspective view of an expandable tool with a surface in an expanded state is depicted in accordance with an advantageous embodiment. In this example, expandable tool 1200 is shown in expandable state 1300.

Figure 14:
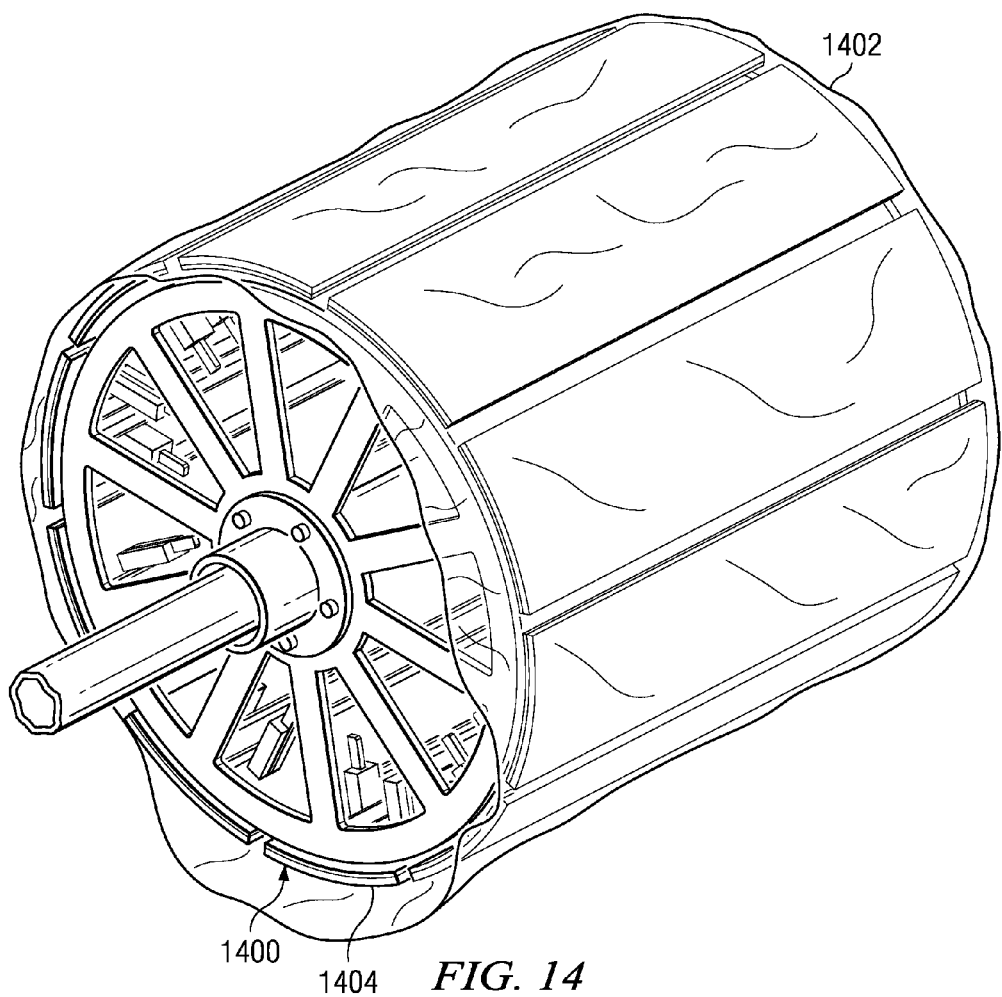
FIG. 14 is a diagram illustrating an expandable tool with a vacuum bag system in accordance with an advantageous embodiment.

With reference now to FIG. 14, a diagram illustrating an expandable tool with a vacuum bag system is depicted in accordance with an advantageous embodiment. Expandable tool 1400 may be an example of one implementation of expandable tool 1132 in FIG. 11. In this example, expandable tool 1400 may have vacuum bag system 1402 installed on surface 1404.

Figure 15:
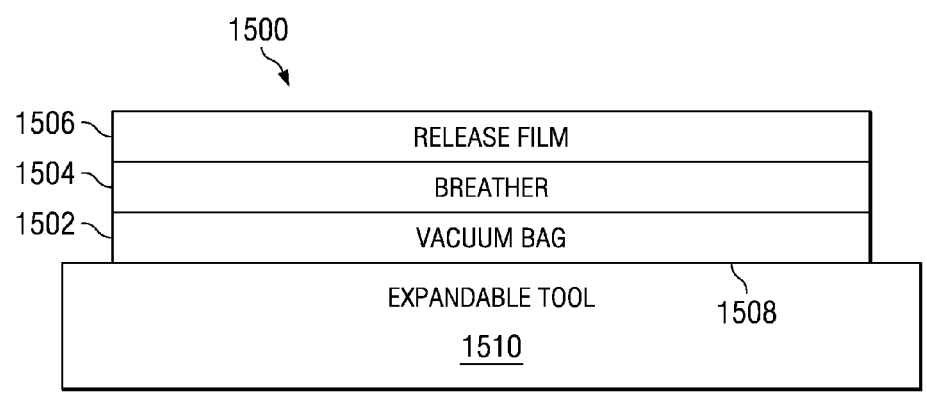
FIG. 15 is a diagram illustrating a cross-sectional view of a vacuum bag system on an expandable tool in accordance with an advantageous embodiment.

With reference now to FIG. 15, a diagram illustrating a cross-sectional view of a vacuum bag system on an expandable tool is depicted in accordance with an advantageous embodiment. In this example, vacuum bag system 1500 may comprise vacuum bag 1502, breather 1504, and release film 1506. Vacuum bag system 1500 may be placed onto surface 1508 of expandable tool 1510.

Figure 16:
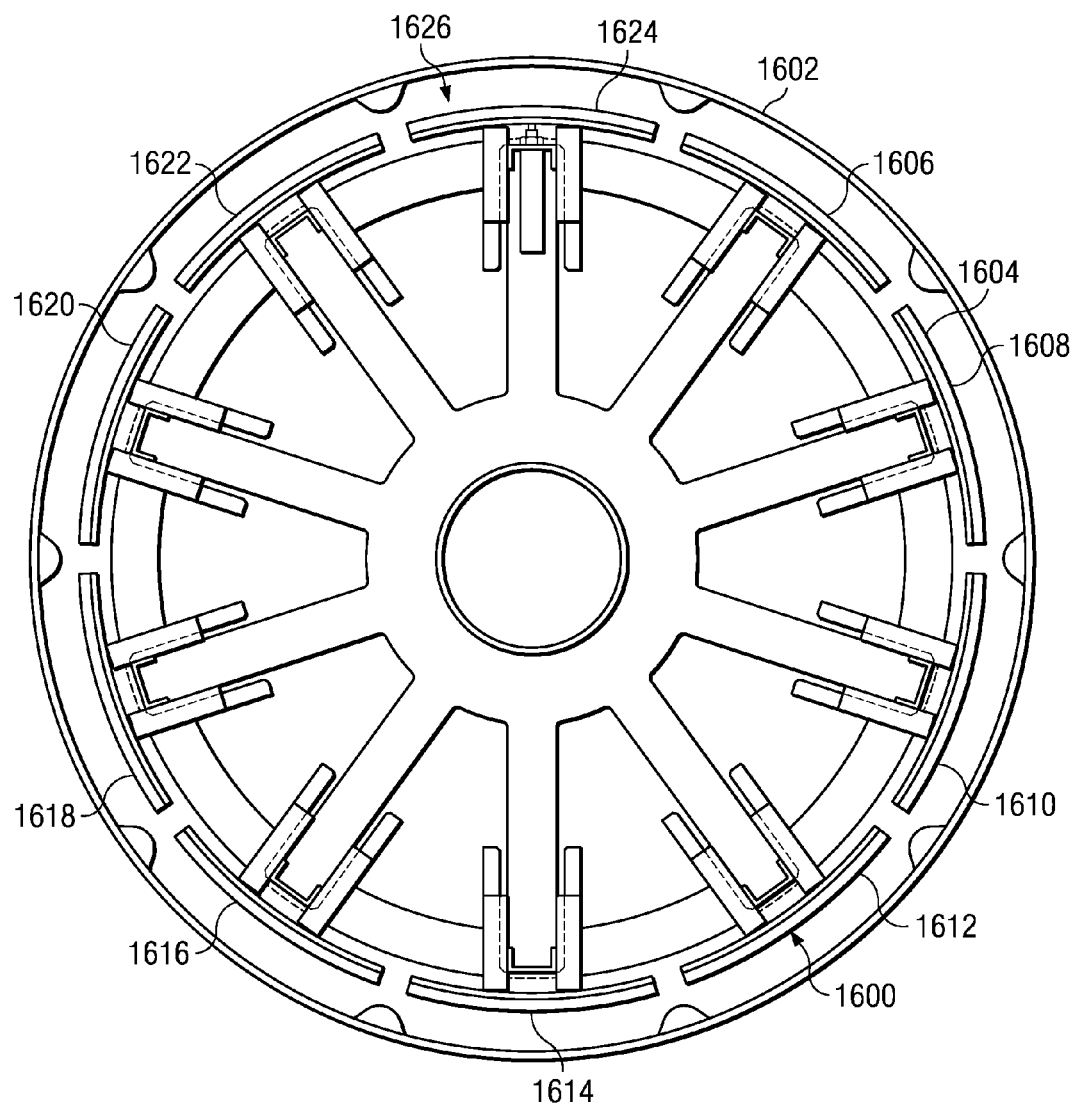
FIG. 16 is a diagram of a side view of an expandable tool within an outer mold line tool in accordance with an advantageous embodiment.

With reference now to FIG. 16, a diagram of a side view of an expandable tool within an outer mold line tool is depicted in accordance with an advantageous embodiment. Expandable tool 1600 may be an example of one implementation for expandable tool 1132 in FIG. 11.

In this illustrative example, expandable tool 1600 may be located inside of outer mold line tool 1602. Expandable tool 1600 may have surface 1604. Surface 1604 may be discontinuous and formed from segments 1606, 1608, 1610, 1612, 1614, 1616, 1618, 1620, 1622, and 1624. In this example, surface 1604 may be in retracted state 1626.

Figure 17:
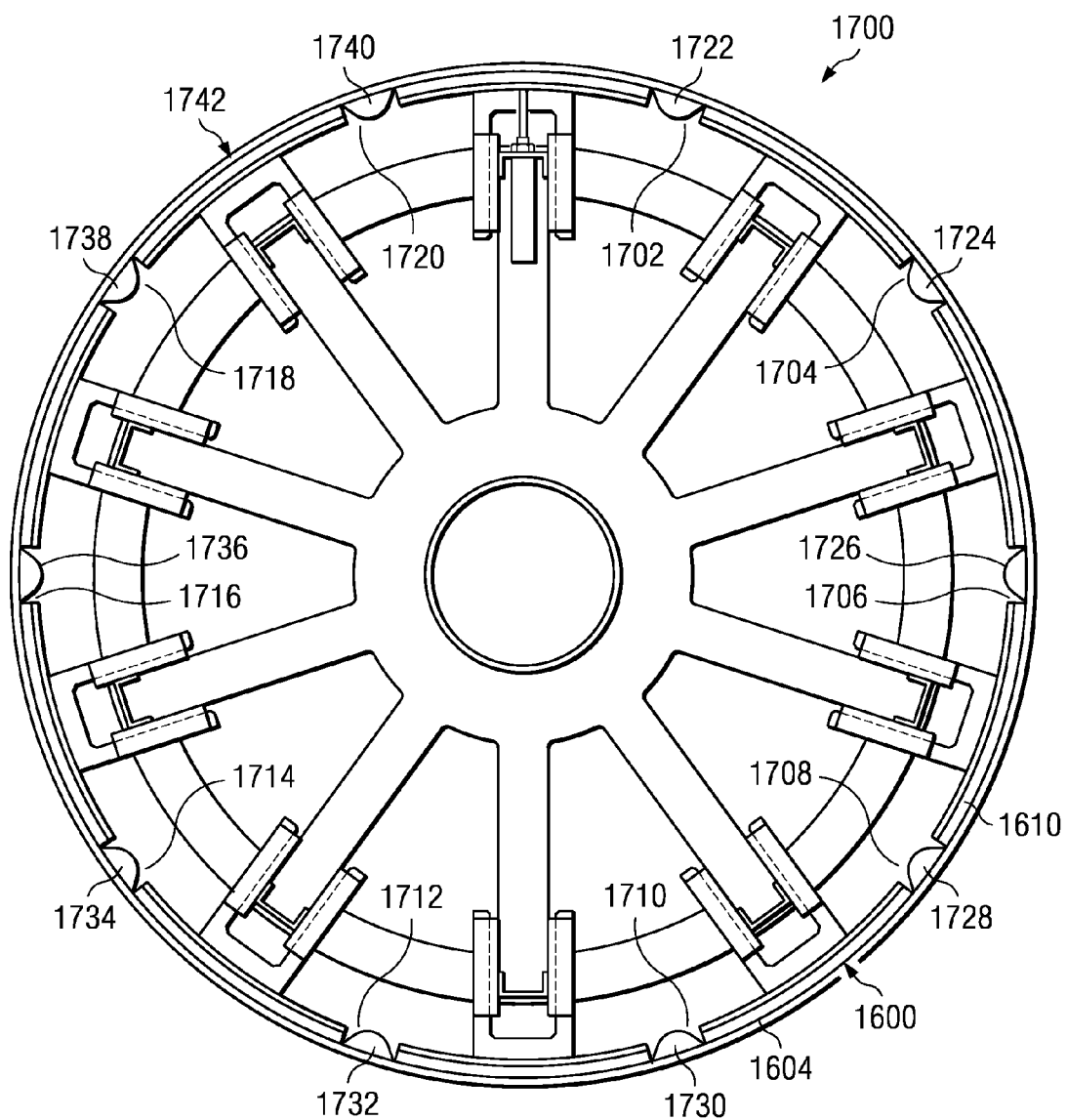
FIG. 17 is a diagram of a side view of an expandable tool within an outer mold line tool in accordance with an advantageous embodiment.

With reference now to FIG. 17, a diagram of a side view of an expandable tool within an outer mold line tool is depicted in accordance with an advantageous embodiment. In this illustrative example, expandable tool 1700 may be in expanded state 1700. In this state, gaps 1702, 1704, 1706, 1708, 1710, 1712, 1714, 1716, 1718, and 1720 in surface 1604 may provide clearance for stringers 1722, 1724, 1726, 1728, 1730, 1732, 1734, 1736, 1738, and 1740 for composite part 1742. These stringers may be placed into the gaps prior to expansion of expandable tool 1700 into expanded state 1700.

Figure 18:
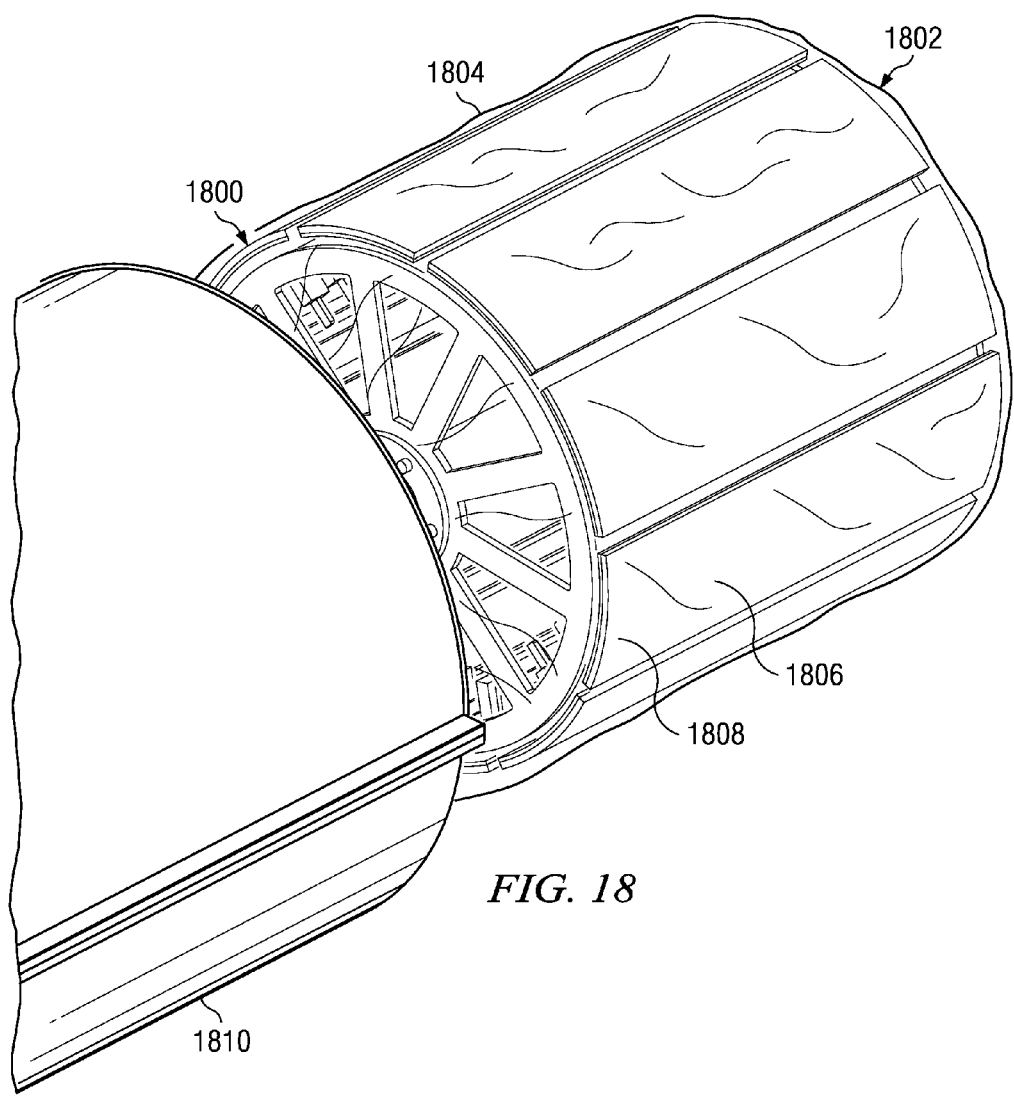
FIG. 18 is a diagram illustrating an expandable tool with a vacuum bag system ready for insertion into an outer mold line tool in accordance with an advantageous embodiment.

With reference now to FIG. 18, a diagram illustrating an expandable tool with a vacuum bag system ready for insertion into an outer mold line tool is depicted in accordance with an advantageous embodiment. Expandable tool 1800 may be an example of another implementation for expandable tool 1132 in FIG. 11.

In this example, expandable tool 1800 may be illustrated with vacuum bag system 1802 installed on expandable tool 1800. Vacuum bag system 1802 may include vacuum bag 1804, breather 1806, and release film 1808. Vacuum bag system 1802 may be ready for insertion and installation onto outer mold line tool 1810.

Figure 19:
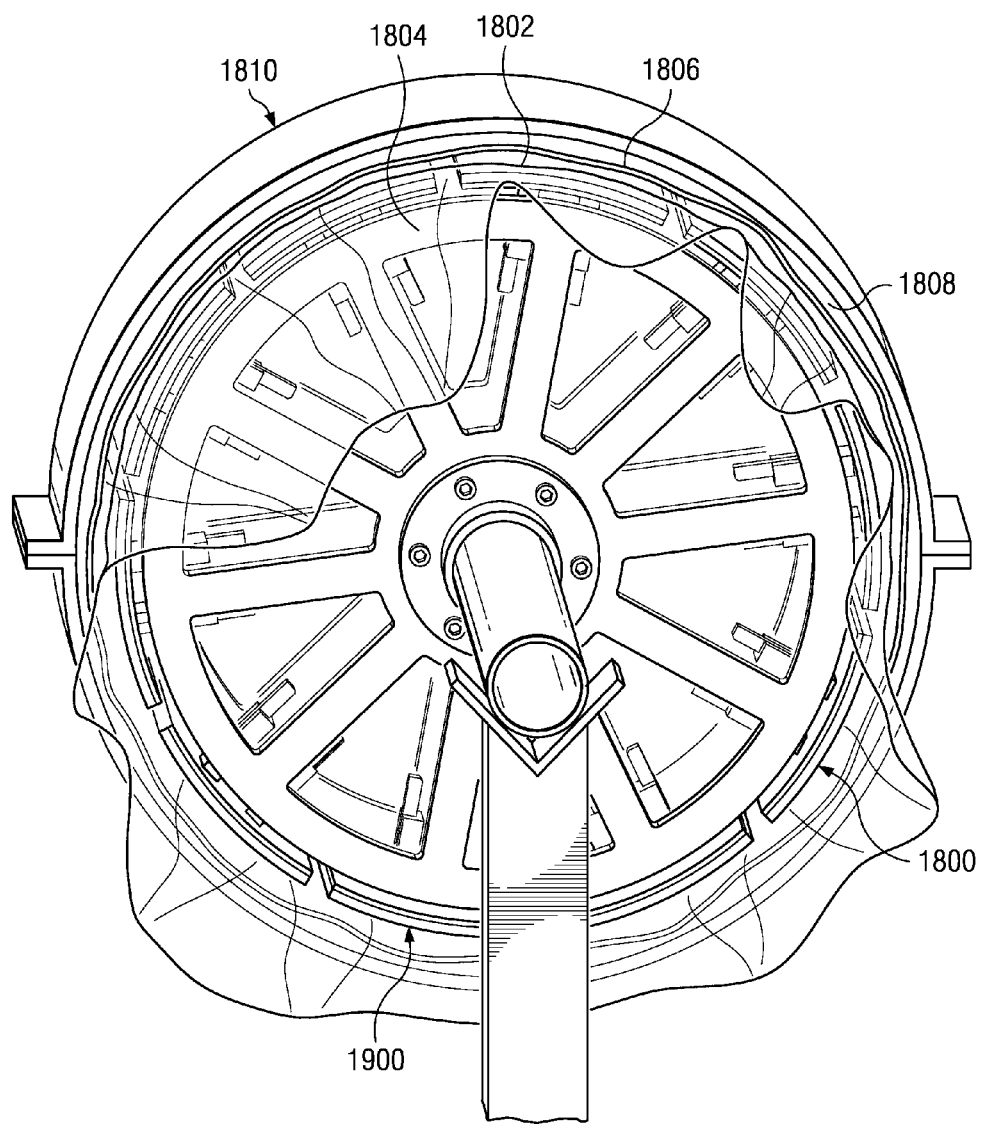
FIG. 19 is a diagram illustrating an expandable tool within an outer mold line tool in accordance with an advantageous embodiment.

With reference now to FIG. 19, a diagram illustrating an expandable tool within an outer mold line tool is depicted in accordance with an advantageous embodiment. In this example, expandable tool 1800 may have been positioned within outer mold line tool 1810. Expandable tool 1800 may be in retracted state 1900 in this example.

Figure 20:
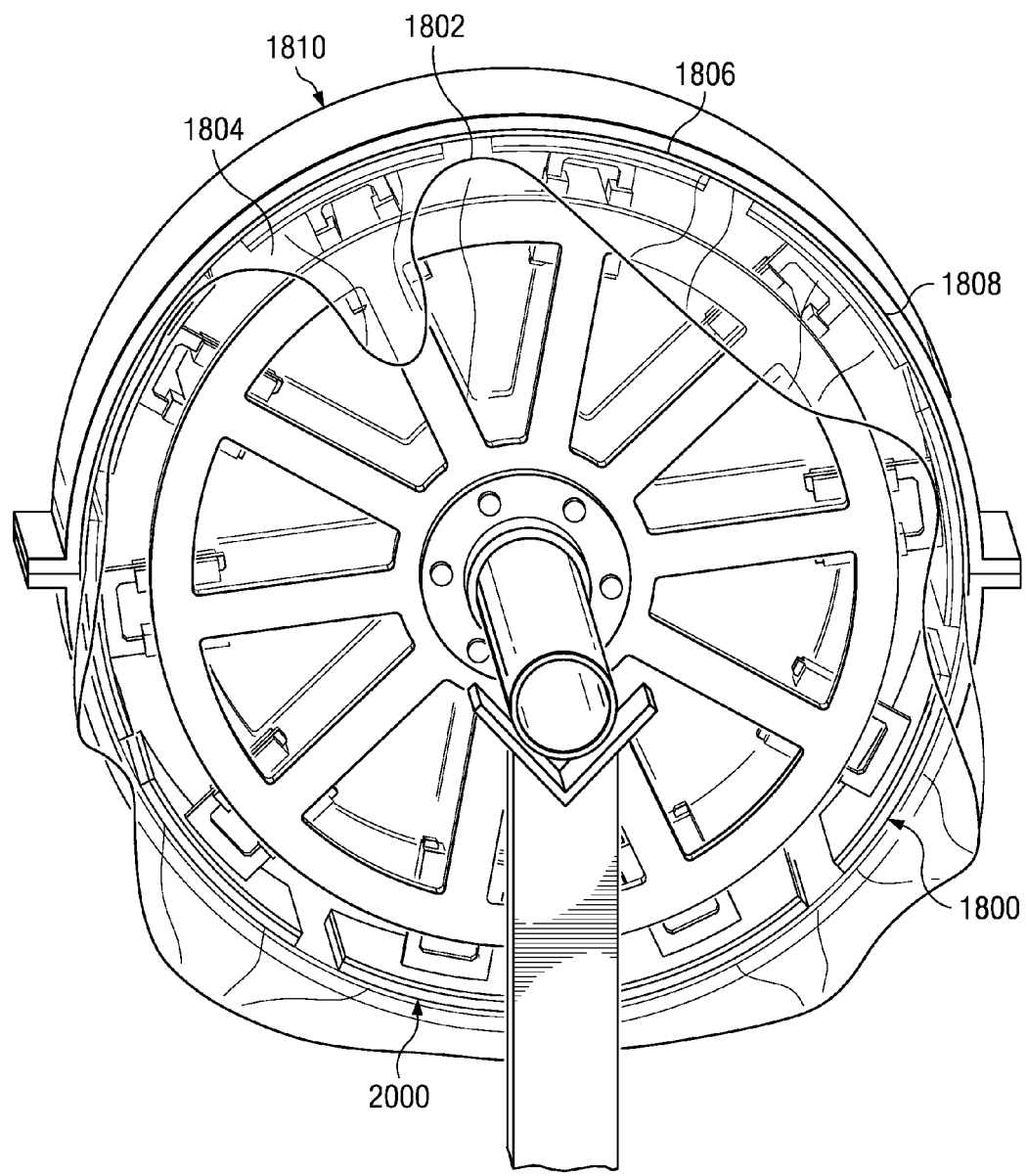
FIG. 20 is a diagram illustrating expansion of an expandable tool within an outer mold line tool in accordance with an advantageous embodiment.

In FIG. 20, a diagram illustrating expansion of an expandable tool within an outer mold line tool is depicted in accordance with an advantageous embodiment. As can be seen in this illustration, expandable tool 1800 may be in expanded state 2000. In this state, vacuum bag system 1802 may be secured to outer mold line tool 1810. Thereafter, expandable tool 1800 may be retracted and removed from within outer mold line tool 1810.

Figure 21:
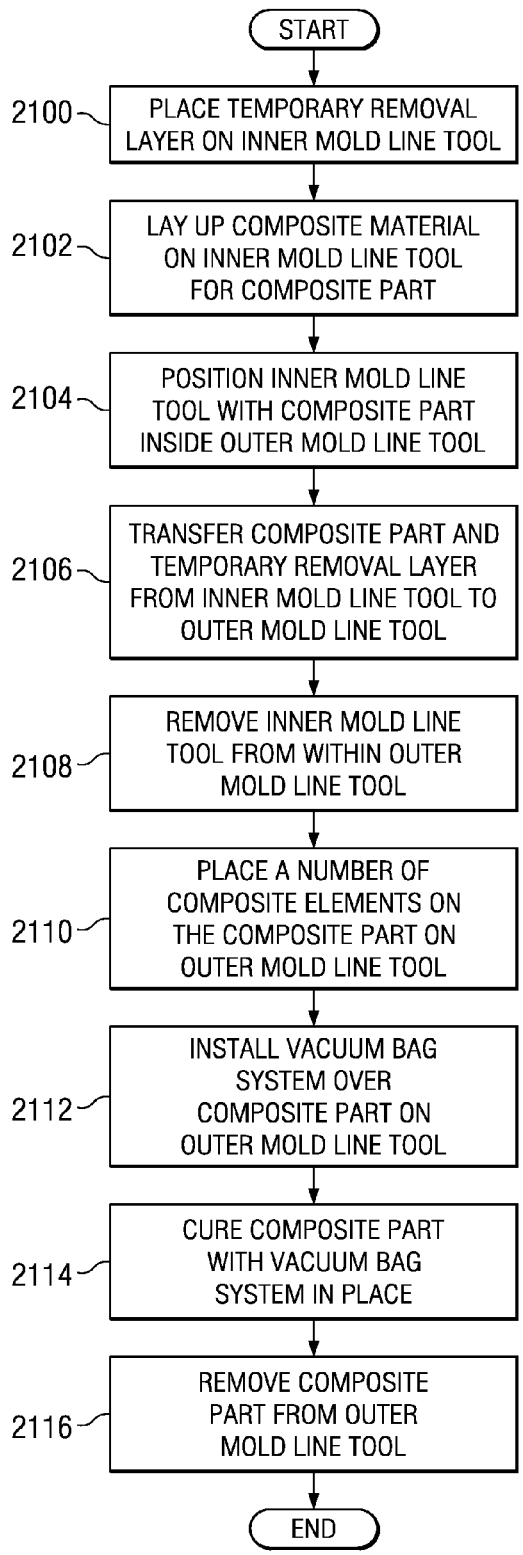
FIG. 21 is a flowchart of a process for manufacturing a composite part in accordance with an advantageous embodiment.

With reference now to FIG. 21, a flowchart of a process for manufacturing a composite part is depicted in accordance with an advantageous embodiment. The process illustrated in FIG. 21 may be implemented using composite manufacturing environment 400 in FIG. 4.

The process may begin by placing temporary removal layer 414 on inner mold line tool 402 (operation 2100). Composite material 416 may then be laid up on inner mold line tool 402 for composite part 412 (operation 2102). The process may then position inner mold line tool 402 with composite part 412 inside outer mold line tool 404 (operation 2104). Composite part 412 and temporary removal layer 414 may be transferred from inner mold line tool 402 to outer mold line tool 404 (operation 2106).

After transfer of composite part 412 and temporary removal layer 414 to outer mold line tool 404, inner mold line tool 402 may be removed from within outer mold line tool 404 (operation 2108). The process may place elements on composite part 412 on outer mold line tool 404 (operation 2110). Vacuum bag system 464 may then be installed over composite part 412 on outer mold line tool 404 (operation 2112). Composite part 412 may then be cured with vacuum bag system 464 in place (operation 2114). Composite part 412 may then be removed from outer mold line tool 404 (operation 2116), with the process terminating thereafter.

Figure 22:
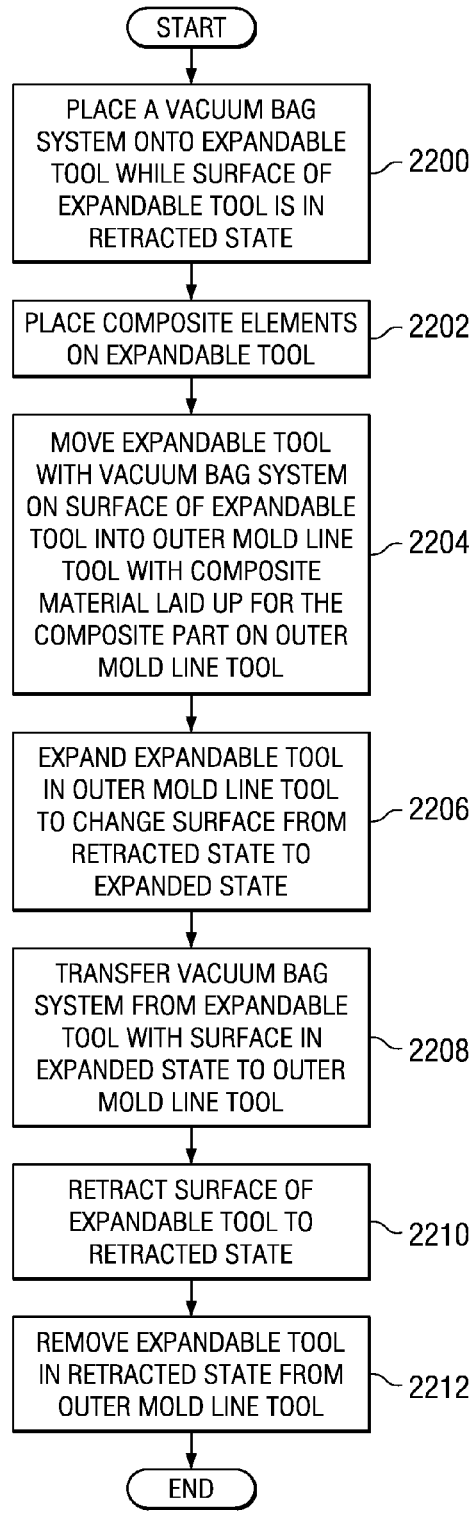
FIG. 22 is a flowchart of a process for positioning components for manufacturing composite parts in accordance with an advantageous embodiment.

With reference now to FIG. 22, a flowchart of a process for positioning components for manufacturing composite parts is depicted in accordance with an advantageous embodiment. The flowchart illustrated in FIG. 22 may be implemented using composite manufacturing environment 1100 in FIG. 11.

The process may begin by placing vacuum bag system 1164 onto expandable tool 1132 while surface 1140 of expandable tool 1132 is in retracted state 1144 (operation 2200). The process may place elements 1172 on expandable tool 1132 (operation 2202). Elements 1172 may be, for example, without limitation, stringers and/or some other suitable elements. The process may then move expandable tool 1132 with vacuum bag system 1164 on surface 1140 of expandable tool 1132 into outer mold line tool 1104 with composite material 1116 laid up for composite part 1112 on outer mold line tool 1104 (operation 2204).

The process may then expand expandable tool 1132 in outer mold line tool 1104 to change surface 1140 from retracted state 1144 to expanded state 1146 (operation 2206). The process may then transfer vacuum bag system 1164 from expandable tool 1132 with surface 1140 in expanded state 1146 to outer mold line tool 1104 (operation 2208).

The process may then retract surface 1140 of expandable tool 1132 to retracted state 1144 (operation 2210). The process may then remove expandable tool 1132 in retracted state 1144 from outer mold line tool 1104 (operation 2212), with the process terminating thereafter.

Figure 23:
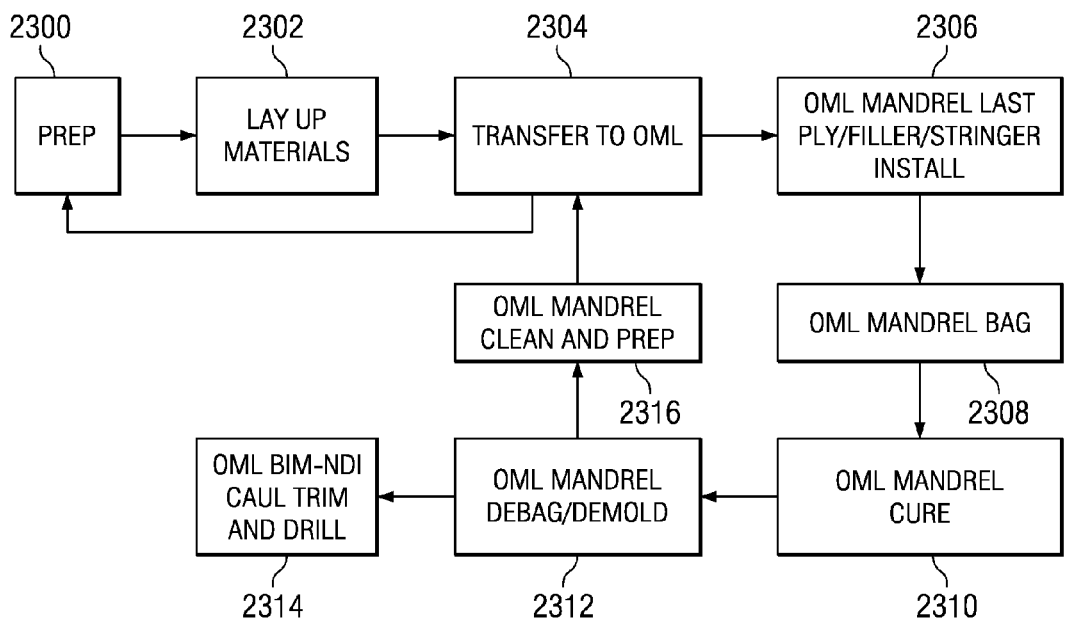
FIG. 23 is a diagram illustrating processing of a composite part in accordance with an advantageous embodiment.

With reference now to FIG. 23, a diagram illustrating processing of a composite part is depicted in accordance with an advantageous embodiment. The process illustrated in FIG. 23 may be implemented in composite manufacturing environment 1100 in FIG. 11.

The process may begin with preparing the tool (operation 2300), as shown in FIGS. 12 and 13. This preparation may include, for example, without limitation, placing a temporary removal layer on the inner mandrel tool. The process may then lay up materials on the inner mold line tool (operation 2302). The process may then transfer the material to the outer mold line tool (operation 2304). The process may then install last ply, filler, and stringers (operation 2306). The process may then place a vacuum bag system over the composite part (operation 2308).

The process may then cure the composite part (operation 2310). The process may then debag and demold the part (operation 2312). Trimming and drilling may then be performed (operation 2314), with the process then terminating. Cleaning and preparation may be performed after operation 2312 on the outer mold line tool (operation 2316), with the process returning to operation 2304. The outer mold line tool may then be ready for further use in operation 2304.

Further, after the composite part has been transferred from the inner mold line tool to the outer mold line tool in operation 2304, the process may then prepare the inner mold line tool for another composite part returning to operation 2300.

In this illustrative example, the inner mold line tool and the outer mold line tool may be used in parallel processes for a shorter duration than a single tool before being ready to be used for another part. As can be seen, the inner mold line tool and the outer mold line tool may be freed up more quickly using the different advantageous embodiments as compared to currently used processes.

The flowcharts and block diagrams in the different depicted embodiments illustrate the architecture, functionality, and operation of some possible implementations of apparatus and methods. In this regard, each block in the flowchart or block diagrams may represent a module, segment, or portion of a process for manufacturing parts. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some advantageous embodiments, additional elements may not be added to the vacuum bag system placed on the composite part. Instead, the elements may be unnecessary or placed on the composite part in a prior process.

Thus, the different advantageous embodiments provide a method and apparatus for manufacturing composite parts and for positioning components for manufacturing composite parts. In the different advantageous embodiments, a removable layer may be placed on an inner mold line tool, a composite material may be laid up on the inner mold line tool for a composite part, and the inner mold line tool may then be positioned with the composite part inside an outer mold line tool.

The composite part and the removable layer may be transferred from the inner mold line tool to the outer mold line tool. The inner mold line tool and the temporary removal layer may then be removed from inside the outer mold line tool after transfer of the composite part and the temporary removal layer to the outer mold line tool.

Further, an expandable tool with the vacuum bag system on a surface of the expandable tool may be moved into the outer mold line tool with the composite material laid up for the composite part on the outer mold line tool. The expandable tool may be expanded in the outer mold line tool to change the surface from a retracted state to an expanded state. The vacuum bag system may be transferred from the expandable tool with the surface in the expanded state.

In this manner, manufacturing of composite parts may be made more efficient. One or more advantageous embodiments may allow the inner mold line tool to be freed up for laying up composite material for another composite part prior to the first composite part being completed. The different advantageous embodiments also may reduce the overall time needed to manufacture a composite part.

Further, one or more different advantageous embodiments may provide a capability to install elements in an uncured form and a vacuum bag system into the interior of an outer mold line tool prior to curing. The different advantageous embodiments may provide parallel operations to occur. For example, an inner mold line tool may be freed up to lay up another composite part after the current composite part has been transferred to an outer mold line tool for processing. Further, with the addition of elements in a vacuum bag to an outer mold line tool, the preparation of these elements may be prepared in parallel with operations in which the other material for the composite part may be laid up on a different tool.

By allowing for one or more parallel operations to occur during the manufacturing of the composite part, one or more of the different advantageous embodiments may reduce the material exposure time out of a freezer. Further, one or more of the different advantageous embodiments also may provide for increased production rates of composite parts.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, other advantageous embodiments may be applied to other types of objects. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a pizza oven, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing composite parts, the method comprising:

moving an expandable tool with a vacuum bag system on a surface of the expandable tool into an outer mold line tool with a composite material laid up on the outer mold line tool;

expanding the expandable tool in the outer mold line tool to change the surface from a retracted state to an expanded state;

transferring the vacuum bag system from the expandable tool with the surface in the expanded state to the composite material laid up on the outer mold line tool;

retracting the expandable tool in the outer mold line tool to change the surface from the expanded state to the retracted state after transferring the vacuum bag system to the composite material;

removing the expandable tool from the outer mold line tool after transferring the vacuum bag system to the composite material; and curing the composite material on the outer mold line tool after removing the expandable tool from the outer mold line tool.

2. The method of claim 1, further comprising:
placing the vacuum bag system onto the surface of the expandable tool while the surface is in the retracted state.

3. The method of claim 1, wherein the moving step comprises:
moving the expandable tool concentrically into the outer mold line tool.

4. The method of claim 1, further comprising:
placing a number of composite elements on the expandable tool.

5. The method of claim 4, wherein the transferring step comprises:
transferring the vacuum bag system and the number of composite elements from the expandable tool with the surface in the expanded state to the outer mold line tool.

6. The method of claim 5, wherein the expanding step comprises:
expanding the expandable tool to change the surface from the retracted state to the expanded state to apply a force such that the vacuum bag system and the number of composite elements couple the composite material.

7. The method of claim 4, wherein the moving step comprises:
moving the expandable tool with the vacuum bag system and the number of composite elements into the outer mold line tool with the composite material laid up on the outer mold line tool; and
aligning the number of composite elements on the expandable tool with a number locations for the number of composite elements.

8. The method of claim 4, wherein the number of composite elements comprise at least one of a stringer, a composite ply, a screen, a metal ply, and a doubler.

9. The method of claim 1, wherein the expandable tool comprises a support structure; a plurality of segments moveably connected to the support structure, wherein the plurality of segments form a surface system with the surface; and an actuator system capable of moving the plurality of segments to change a state of the surface between the retracted state and the expanded state.

10. The method of claim 9, wherein the support structure comprises a reel; and a plurality of slide members connected to the reel, wherein each segment in the plurality of segments is slidably attached to a corresponding slide member in the plurality of slide members.

11. The method of claim 9, wherein the actuator system comprises a plurality of linear actuators, wherein each segment in the plurality of segments is connected to an associated linear actuator in the plurality of linear actuators.

12. The method of claim 9, wherein the reel has a channel and further comprises:
a shaft, wherein the reel is capable of receiving the shaft and wherein the shaft is capable of supporting the reel.

13. A method for installing components for a section of a composite aircraft fuselage, the method comprising:
placing a vacuum bag system onto a surface of an expandable tool while the expandable tool is in a retracted state;
placing a number of composite elements on the expandable tool after placing the vacuum bag system onto the surface, wherein the number of composite elements comprise at least one of a stringer and a doubler;
moving the expandable tool with the vacuum bag system and the number of composite elements into an outer mold line tool with a composite material laid up on the outer mold line tool;
aligning the number of composite elements on the expandable tool with a number locations for the number of composite elements;
expanding the expandable tool in the outer mold line tool to change the surface from a retracted state to an expanded state to apply a force such that the vacuum bag system and the number of composite elements adhere to the composite material;
transferring the vacuum bag system and the number of composite elements from the expandable tool with the surface in the expanded state to the outer mold line tool, wherein the vacuum bag system and the number of composite elements adhere to the composite material;
retracting the expandable tool in the outer mold line tool to change the surface from the expanded state to the retracted state after transferring the vacuum bag system and the number of composite elements to the outer mold line tool;
removing the expandable tool from the outer mold line tool after transferring the vacuum bag system and the number of composite elements to the outer mold line tool; and
curing the composite material on the outer mold line tool after removing the expandable tool from the outer mold line tool,
wherein the expandable tool comprises a support structure, a plurality of segments, and an actuator system, wherein the plurality of segments are moveably connected to the support structure and form a surface system with the surface, wherein the actuator system is capable of moving the plurality of segments to change a state of the surface between the retracted state and the expanded state, wherein the support structure comprises a reel and a plurality of slide members connected to the reel, wherein each segment in the plurality of segments is slidably attached to a corresponding slide member in the plurality of slide members; wherein the actuator system comprises a plurality of linear actuators, wherein each segment in the plurality of segments is connected to an associated linear actuator in the plurality of linear actuators, and wherein the reel has a channel that is capable of receiving a shaft, wherein the shaft is capable of support the reel.

\* \* \* \* \*